US008924730B2

United States Patent
Carlson et al.

(10) Patent No.: US 8,924,730 B2
(45) Date of Patent: Dec. 30, 2014

(54) DIGITAL WATERMARKING FOR SECURE TRANSMISSION BETWEEN A SOURCE COMPONENT AND A NODE DEVICE

(71) Applicants: Albert Carlson, Moscow, ID (US); Steven B. Cohen, Las Vegas, NV (US); Lawrence duBoef, Las Vegas, NV (US); H. Stan Johnson, Henderson, NV (US)

(72) Inventors: Albert Carlson, Moscow, ID (US); Steven B. Cohen, Las Vegas, NV (US); Lawrence duBoef, Las Vegas, NV (US); H. Stan Johnson, Henderson, NV (US)

(73) Assignee: Xsette Technology, Inc., Las Vegas, NV (US)

( * ) Notice: Subject to any disclaimer, the term of this patent is extended or adjusted under 35 U.S.C. 154(b) by 0 days.

(21) Appl. No.: 13/940,872

(22) Filed: Jul. 12, 2013

(65) Prior Publication Data
US 2014/0325233 A1 Oct. 30, 2014

Related U.S. Application Data

(60) Provisional application No. 61/671,072, filed on Jul. 12, 2012.

(51) Int. Cl.
*H04L 9/32* (2006.01)
*H04L 9/00* (2006.01)
*H04L 9/08* (2006.01)
*G06F 21/16* (2013.01)

(52) U.S. Cl.
CPC ........ *G06F 21/16* (2013.01); *G06F 2221/0733* (2013.01); *H04L 9/0866* (2013.01); *H04L 2209/608* (2013.01)
USPC .............................. 713/176; 713/165; 380/44

(58) Field of Classification Search
CPC ............ H04L 9/3247; H04L 2209/608; H04L 9/0866; G06F 21/16; G06F 2221/0733
USPC ...................................... 713/176, 165; 380/44
See application file for complete search history.

(56) References Cited

U.S. PATENT DOCUMENTS

| | | | | |
|---|---|---|---|---|
| 6,374,036 B1 * | 4/2002 | Ryan et al. | ..................... | 386/261 |
| 6,636,968 B1 * | 10/2003 | Rosner et al. | ................. | 713/178 |
| 6,683,954 B1 * | 1/2004 | Searle | ............................. | 380/30 |
| 6,865,550 B1 * | 3/2005 | Cok | ................................ | 705/51 |
| 7,376,624 B2 * | 5/2008 | Cochran et al. | ................. | 705/53 |
| 8,127,137 B2 * | 2/2012 | Levy | ............................. | 713/176 |

(Continued)

OTHER PUBLICATIONS

P. Bassia et al. (Robust audio watermarking in the time domain, Jun. 27, 2001).*

(Continued)

*Primary Examiner* — Zachary A Davis
*Assistant Examiner* — Oleg Korsak
(74) *Attorney, Agent, or Firm* — Michael A. Kerr; Kerr IP Group, LLC

(57) ABSTRACT

A system and method for embedding a watermark into a data file and communicating the data file to a particular node from a source component is described. The system includes a particular node, a source component, a node identifier request, a query, a watermark, a permutation key, an encrypted data file, and a node decryption key. The node identifier request is communicated from the source component to the particular node. The watermark is then embedded into the data file by the source component. The permutation key is configured to permute the watermark and the permutation key is changed so the location of the watermark changes. The encrypted data is decrypted at the particular node with the node decryption key that corresponds to the particular node. The particular node recovers the watermark from the data file with the permutation key.

21 Claims, 11 Drawing Sheets

(56) References Cited

U.S. PATENT DOCUMENTS

| | | | |
|---|---|---|---|
| 8,345,870 B2 * | 1/2013 | Kordon et al. | 380/236 |
| 8,364,966 B2 * | 1/2013 | Johnson et al. | 713/176 |
| 8,423,778 B2 * | 4/2013 | Mohanty | 713/176 |
| 8,538,066 B2 * | 9/2013 | Petrovic et al. | 382/100 |
| 2001/0046099 A1 | 11/2001 | Hamai | |
| 2007/0242824 A1 | 10/2007 | Vishik | |
| 2009/0049303 A1 | 2/2009 | Hart | |
| 2009/0195698 A1 | 8/2009 | Chen | |
| 2011/0255690 A1 | 10/2011 | Kocher | |

OTHER PUBLICATIONS

USPTO, Office Action of Feb. 5, 2014 for U.S. Appl. No. 13/940,882.

* cited by examiner

Watermarking

DIGITAL WATERMARKING FOR SECURE TRANSMISSION BETWEEN A SOURCE COMPONENT AND A NODE DEVICE

CROSS-REFERENCE

This patent application claims the benefit of Provisional Patent Application 61/671,072 entitled METHOD, SYSTEM AND DEVICE FOR SECURING DATA filed on Jul. 12, 2012, which is hereby incorporated by reference in this patent application.

FIELD

The present invention relates to digital watermarking for secure transmission of a data file from a source component to a node device. More particularly, the system and method uses watermarking to securely communicate a data file from the source component to a particular node having a node identifier.

BACKGROUND

Broadcast communications between a source component, such as a server, and a node device, such as a client, are commonly used to communicate content to authorized users. Broadcast communications may also be used to transmit pirated content. Pirated content refers to the act of copyright infringement including, but not limited to, the use of peer-to-peer file sharing networks to access content by unauthorized users.

Most video, audio, and video-audio streams are broadcast to client or "node" devices capable of receiving and interpreting the signal. Servers are used to customize these data streams on a large scale for each web-based user and set-top box user. Encryption is commonly used by these servers to prevent piracy.

Encryption is the process of encoding messages or information in such a way that hackers cannot read the messages, but that authorized parties can access the content. In an encryption scheme, the message or information, referred to as "plaintext," is encrypted using an encryption algorithm, turning it into an unreadable "ciphertext." This is usually done with the use of an encryption key, which specifies how the message is to be encoded. Any adversary that can see the ciphertext should not be able to determine anything about the original message. An authorized party, however, is able to decode the ciphertext using a decryption algorithm, that usually requires a secret decryption key, that "pirates" do not have access to. For technical reasons, an encryption scheme uses a key-generation algorithm to randomly produce keys.

There are two basic types of encryption schemes: Symmetric-key and asymmetric-key encryption which includes public-key encryption. In symmetric-key schemes, the encryption and decryption keys are the same. Thus, communicating parties must agree on a secret key before they wish to communicate. In public-key schemes, the encryption key is published for anyone to use and encrypt messages. However, only the receiving party has access to the private decryption key and is capable of reading the encrypted messages. Public-key encryption is a relatively recent invention. Historically, all electronic encryption schemes have been symmetric-key (also called private-key) schemes.

There are limitations to currently used encryption system and methods. The main problem with present day encryption systems is that they use a cipher and a decryption key that can be found using a decryption algorithm. Once the decryption key is found, other unauthorized users are informed of the decryption key and then the unauthorized user can read any message encrypted with the key "k" and cipher "c." Although many modern ciphers claim that the number of keys in the key space ($|K|$) is so large that the probability of locating the correct is so remote as to render the message totally secure. However, this is not the case. Modern ciphers are broken with sufficient regularity as to question the security of the message. Therefore, an encryption alone is not sufficient to guarantee security. Another factor must be used to connect the encryption to a single node.

In addition to encryption, broadcast communications between source components also utilize data compression. Data compression (also known as bit-rate reduction, source coding, or simply "compression") is a method, algorithm, or process that produces a compressed file that attempts to represent the same data as an uncompressed file but in a smaller form. A goal of data compression is to produce a compressed file that occupies less storage space when stored and requires less bandwidth when transmitted.

Compression algorithms usually fall into two categories—those that operate over a predefined portion of a file, and those that operate over an entire file. Compression algorithms that operate over a predefined portion of a file include the MPEG-4 algorithm for video compression operates over a predefined portion of a video frame or video file. Compression algorithms that operate over an entire file include the Lempel-Ziv (also known as Lempel-Ziv-Welch or LZW) family of compression algorithms.

A disadvantage of compression algorithms that operate over a predefined portion of a file is that the algorithm fails to recognize and compress larger patterns in a file. Conversely, compression algorithms that operate over an entire file consider only the bulk of the file and cannot respond to discrete portions of a file that could benefit from a different compression algorithm.

Due in part to the drawbacks of these approaches, compression algorithms have been developed that recognize objects inside electronic files and separate them for time constrained optimal compression. However, the detection and isolation of objects for optimal compression requires time and computing effort that can often cause the compression to execute slowly.

SUMMARY

A system for embedding a watermark into a data file and communicating the data file to a particular node from a source component is described. The system includes a particular node, a source component, a node identifier request, a query, a watermark, a permutation key, an encrypted data file, and a node decryption key. The particular node is communicatively coupled to a network. The source component is also communicatively coupled to the network and the source component communicates with the particular node. The node identifier request is communicated from the source component to the particular node. The query is then performed at the particular node for at least one node identifier that is unique to the particular node.

The watermark is then embedded into the data file by the source component. The permutation key is configured to permute the watermark and the permutation key is changed so the location of the watermark changes. The encrypted data file is then generated by the source component, and the encrypted data file is produced with an encryption algorithm that utilizes the unique node identifier to generate an encryption key. The node decryption key generated by the source component is communicated to the particular node. The encrypted data file is then communicated from the source component to the particular node. The encrypted data file includes the node decryption key for the particular node. The encrypted data is decrypted at the particular node with the node decryption key that corresponds to the particular node. The particular node recovers the watermark from the data file with the permutation key.

In one illustrative embodiment, the watermark is used to detect the source component for the data file, and when the watermark does not correspond to the particular node device, the source component is configured to interrupt transmission of the data file.

In another illustrative embodiment, the watermark includes an invisible watermark configured to be embedded in at least one data frame corresponding to the data file. Additionally, the illustrative system may be configured to receive an audio stream that includes an invalid watermark that does not correspond to the particular node device, and the particular node device is configured to modify the audio stream because of the invalid watermark.

In yet another embodiment, the encrypted data file includes a plurality of inserted bits that are inserted into a plurality of data frames that correspond to the data file. Additionally, the encrypted data file for the particular node may include removing a plurality of bits from a plurality of data frames that correspond to the data file. In the illustrative system, the data file includes at least one of an audio file, a video file and an audio-video file.

In another illustrative embodiment, the node encryption key generated by the source component and communicated to the particular node includes a partial decryption key that is communicated from the source component to the particular node. A complete decryption key is then assembled at the particular node with the unique node identifier and the partial decryption key.

In an illustrative peer-to-peer system embodiment, a node-to-node implementation is described, in which the particular node is a first node and the source component is a second node. The system and method of operation for the node-to-node implementation is similar to the source component communications with the particular node presented herein.

A method for embedding a watermark into a data file and communicating the data file to a particular node from a source component is also described. The method includes performing a query at the particular node for at least one node identifier that is unique to the particular node. The unique node identifier is then communicated from the particular node to the source component. The source component embeds a watermark into the data file. The watermark is permuted with a permutation key. The permutation key in the data file changes so the location of the watermark changes. An encrypted data file for the particular node is generated at the source component. The encrypted data file is produced with an encryption algorithm that utilizes the unique node identifier to generate an encryption key. The encrypted data file from the source component is communicated to the particular node. The encrypted data file includes a node decryption key for the particular node and the permutation key for the watermark. The encrypted data file is decrypted at the particular node with the node decryption key that corresponds to the particular node. The particular node proceeds to recover the watermark from the data file with the permutation key.

In one illustrative embodiment, the method includes detecting the watermark in the data file and identifying the source component, and when the watermark does not correspond to the particular node device, the source component is configured to interrupt transmission of the data file.

Further yet, the method may also include generating the encrypted data file for the particular node at the source component and inserting bits into a plurality of data frames corresponding to the data file. Additionally, the method may include removing bits from a plurality of data frames corresponding to the data file. In the illustrative method, the data file includes at least one of an audio file, a video file, and an audio-video file.

In another illustrative embodiment, the watermark includes an invisible watermark configured to be embedded in at least one data frame corresponding to the data file. Additionally, the data file may be split into an audio stream and a video stream. Furthermore, the illustrative method may receive an audio stream that includes an invalid watermark that does not correspond to the particular node device, and the particular node device modifies the audio stream because of the invalid watermark.

FIGURES

The present invention will be more fully understood by reference to the following drawings which are for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure.

In general, the illustrative systems, methods and devices described herein are applied to broadcast communications generated from a central location such as a network operations center that manages or controls the distribution of content. For example, the illustrative systems, method and devices are used to securely communicate video content, audio content, audio-video content, gaming content, Pay-Per-View content, sports content, and other such content.

The devices, systems, and methods presented herein are intended to curb the piracy of various types of content. The piracy problem solved by the devices, systems, and methods presented herein relates to the unauthorized transmission of content to unauthorized end users that have not paid to access the content. In general the term "content" includes, but is not limited to, text files, picture files, audio files, video files, audio-video files, or any combination thereof.

Although piracy concerns are related to broadcast communications, it shall be appreciated by those of ordinary skill in the art having the benefit of this disclosure that the systems, methods, and devices presented herein are not confined to simplex communications, but are also applicable to half-duplex communications and full-duplex communications.

In this description, the term "data file" is used interchangeably with the term "content." However, the term "content" may be interpreted more narrowly to apply to broadcast communications, and to avoid this narrow interpretation the term "data file" is used to more generally refer to any type of communications including simplex, half duplex, and full duplex communications. In the illustrative embodiments presented herein, the data file includes a plurality of data frames.

Figure 1A:
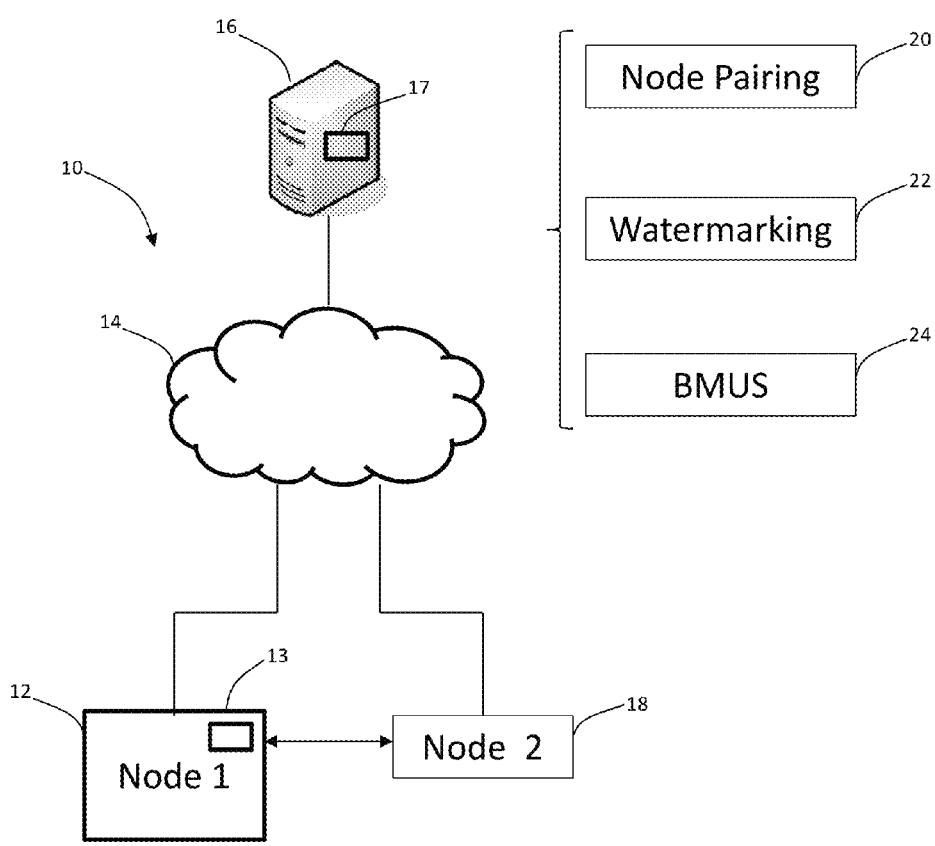
FIG. 1A shows an illustrative high level system drawing of communications between a particular node and a source component.

Referring now to FIG. 1A, there is shown an illustrative high level system 10 for communications between a particular node and a source component. The illustrative particular node 12 is communicatively coupled to a network 14. The particular node 12 may be embodied as a chip, system-on-a-chip, a microprocessor, an integrated circuit, an access point, a femtocell, a client device, a personal computer, a smartphone, a tablet computer, a wireless device, a hard drive, and any other such electronic device configured to be operatively coupled to a network and having stored there on at least one node identifier that is unique to the particular node. An illustrative node device 100 is presented in FIG. 2 below.

The illustrative node 12 may also configured to include a security module 13 that is configured to perform the operation described herein by the node device. By way of example and not of limitation, the illustrative security module 13 may be embodied as a codec or other such computer program configured to perform the operations presented herein.

The source component 16 is also communicatively coupled to the network 14 and is configured to communicate at least one data file 17 to the particular node 12 and illustrative node 18. In the illustrative embodiment, the source is configured to generate or communicate content such as programming content from a cable TV operator. Additionally, the source may also be embodied as a server that is configured to communicate programming content to node devices, i.e. clients. In yet another embodiment, the source component may also be embodied a cloud computing environment, in which the programming content may be stored in a plurality of servers that perform various operations consistent with the server farm facilities supporting the cloud computing environment.

In an illustrative peer-to-peer embodiment, the source component 16 may also be embodied as a separate node that is communicatively coupled to the illustrative particular node 12. In this illustrative peer-to-peer system embodiment, the particular node 12 may also be referred to as a "first node" and the source component 16 may be referred to as a "second node." Alternatively, the particular node 12 may perform the function of the source component 16 and operate as a "second node," in which node 18 operates as the "first node."

The illustrative system 10 performs the operations that support the secure transmission between the source component 16 and the node device 12, which is also referred to as "node pairing," and which is embodied in an illustrative node pairing module 20. More generally, node pairing module 20 refers to generating an encrypted data stream with a unique node identifier that can only be decrypted by the node having the unique node identifier. In the illustrative embodiment, node pairing 20 is managed and controlled by the source component 16.

Additionally, the illustrative system 10 supports digital watermarking for secure transmission between the source component and the node device in watermarking module 22. More generally, watermarking module 22 includes embedding a watermark into the data file that is communicated by the source component 16. The watermark changes location in the data file and the particular node 12 recovers the watermark from the data file. In one illustrative embodiment, when the watermark does not correspond to the particular node device, the source component 16 is configured to interrupt the transmission of the data file.

Furthermore, the illustrative system 10 supports a Block Management Unification System and method (BMUS). In general, the BMUS module 24 divides the source component 16 data file into a plurality of blocks that are rearranged, encrypted and compressed. The resulting compressed and encrypted file is then communicated to the particular node device 12.

In operation, the system 10 can support node pairing 20, watermarking 22, BMUS 24, and any combination thereof. Each of these different processes are configured to operate independently of one another, or may be used in combination to improve the security of the communications between the source component 16 and the particular node device 12.

Figure 1B:
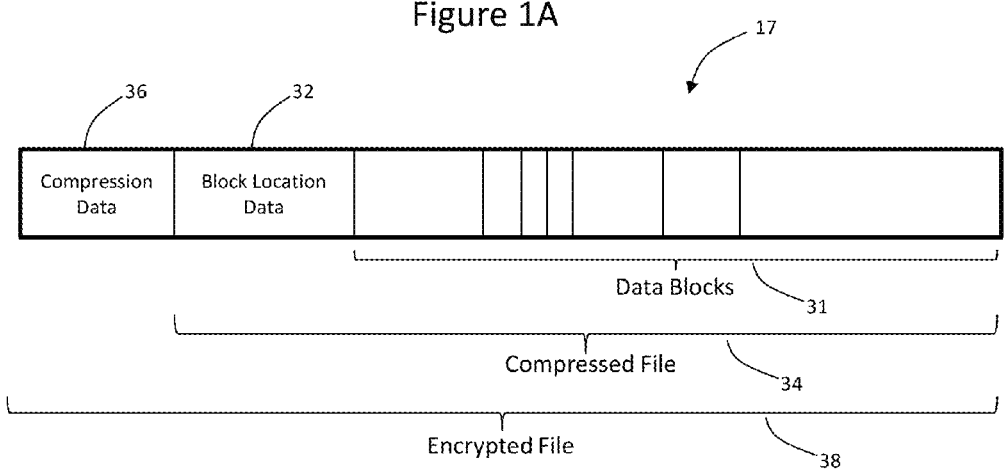
FIG. 1B shows an illustrative data file that includes a plurality of data frames.

Referring to FIG. 1B there is shown an illustrative data file 17. The data file 17 includes a plurality of data frames. More generally, the data file 17 includes any data in any form, including a data stream. Moreover, the data file exists independently of any compression, encryption, or other form of data manipulation. However, the data file may depend upon the various operations presented herein, namely, node pairing 20, watermarking 22, block management unification system 24, and any combination thereof. The data file may also refer video data, audio data, audio-video data, text data, software code data, firmware data, or any other such electronic data. The data file 17 may be stored on a medium, such as an optical disc, flash memory drive, magnetic data storage medium, or the like, and be physically moved from one device to another. It is also contemplated that the data file may be prepared and used at a single device, i.e., without transmitting or physically moving the file from one device to another.

The illustrative data file 17 may be stored as an encrypted or unencrypted file. To transmit the entire original data file 17, data may be reassembled, compressed, and encrypted prior to transmitting the file. In one illustrative embodiment, a user may be required to present the correct credentials, such as biometric information, that must be scanned to decrypt the data. In another embodiment, biometric identification information may be stored in a dispersed database, optionally secured according to a method of the present invention, and the biometric identification information may be used to create the key for communications. For example, each new record of the original data file 17 can only be accessed with a new input of biometric data. Similarly, if a screen times out, display of the original data file 17 may only be refreshed by rescanning the biometric data.

In an illustrative embodiment employing compression, the compression may include a compression data frame 36 and a block location data frame 32. The compression data frame 36 may be generated to guide decompression of the data file 17. The compression data frame 36 may include information regarding the compression algorithms and may be appended to the front of the data file 17. As may be appreciated, the compression data frame 36 need not be contiguous or linear. Similarly, a randomization sequence necessary for the next portion of the compression data frame 36 can also be inserted into the compressed file 34. It is contemplated that any randomization method can be used including a polymorphic randomization method.

In the illustrative embodiment, the block location data frame 32 is compressed and encrypted, and the compressed data file 34 is encrypted, thereby hiding the encryption keys (not shown) for reconstructing the original data file 17.

Figure 2:
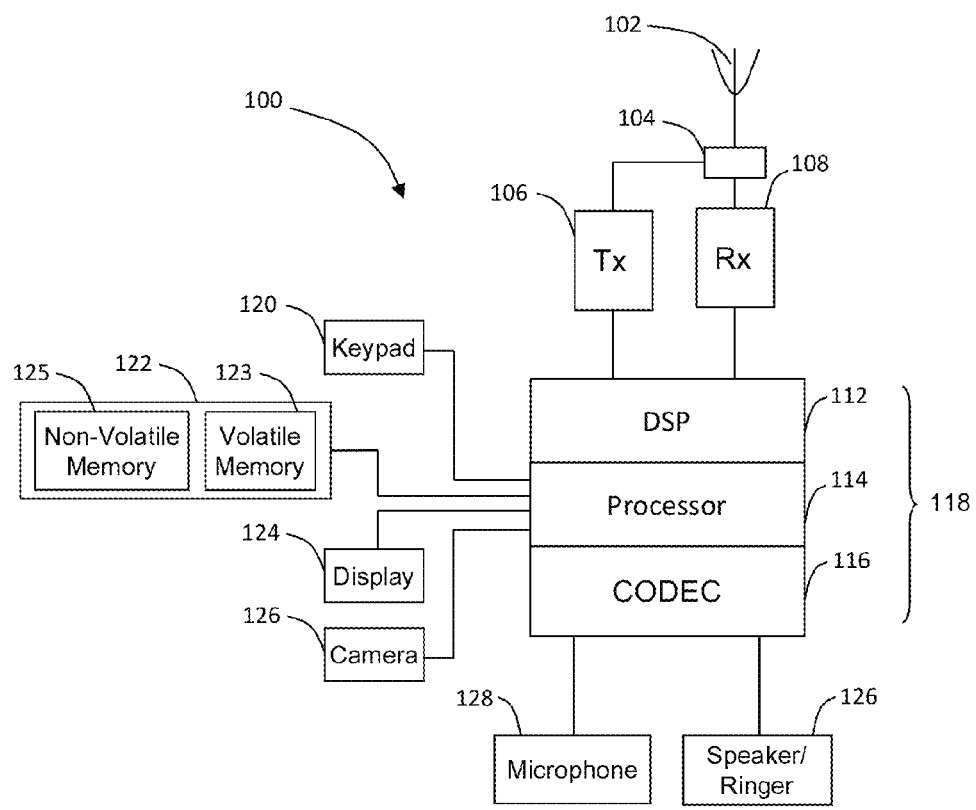
FIG. 2 shows the electrical components for an illustrative node device.

Referring to FIG. 2, there is shown the electrical components for an illustrative node device 100. In one illustrative embodiment, the node device 100 simply includes a processor 114 that communicates with a memory 122 that stores program instructions executable by the data processor to carry out the operations of the node pairing module 20, the watermarking module 22 and the block management unification system module 24 presented herein. The illustrative memory 122 may take any form, including optical, magnetic, or flash memory, or the like. It is contemplated that the memory 122 may be local to the data processor 114 or may be remote from the data processor and may take the form of file server storage, remote storage, cloud storage, or the like, and the program instructions may, consequently, take the form of software, firmware, cloudware, or the like.

In another illustrative node device 100 is a multimode node device that comprises a first antenna element 102 that is operatively coupled to a duplexer 104, which is operatively coupled to a multimode transmitter module 106, and a multimode receiver module 108.

An illustrative control module 118 comprises a digital signal processor (DSP) 112, a processor 114, and a CODEC 116 that are communicatively coupled to the transmitter 106 and receiver 108. The illustrative CODEC 116 may be configured to receive the node pairing module 20, the watermarking module 22, the block management unification system module 24, or any combination of the above modules.

It shall be appreciated by those of ordinary skill in the art that the transmitter module and receiver module are typically paired and may be embodied as a transceiver. The illustrative transmitter 106, receiver 108, or transceiver is communicatively coupled to antenna element 102.

The DSP 112 may be configured to perform a variety of operations such as controlling the antenna 102, the multimode transmitter module 106, and the multimode receiver module 108. The processor 114 is operatively coupled to a responsive input sensor 120 such as a keypad or a touch screen. In operation, the responsive input sensor 120 receives a responsive input after the illustrative dynamic portal or context aware news feed is presented to the end user.

The processor 114 is also operatively coupled to a memory 122, a display 124, and a camera 126. The camera 126 may be used to determine an indoor and outside location for the illustrative node device.

Additionally, the processor 114 is also operatively coupled to the CODEC module 116 that performs the encoding and decoding operations for audio, and is communicatively coupled to a speaker 126 and a microphone 128. The CODEC module 116 is also communicatively coupled to the display 124 and provides the encoding and decoding operations for video.

The memory 122 includes two different types of memory, namely, volatile memory 123 and non-volatile memory 125. The volatile memory 123 is computer memory that requires power to maintain the stored information, such as random access memory (RAM). The non-volatile memory 125 can retain stored information even when the node device 100 is not powered up. Some illustrative examples of non-volatile memory 125 include flash memory, ROM memory, and hard drive memory.

Figure 3:
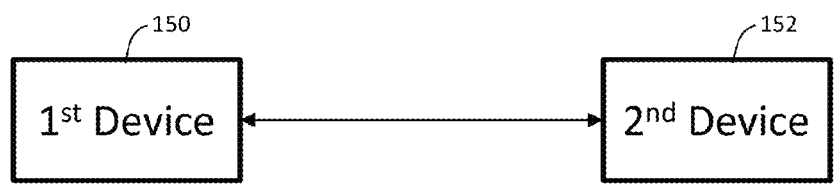
FIG. 3 shows a device communicating a data file to an unauthorized second device attempting to receive the pirated or unlicensed content.

Referring to FIG. 3, there is shown a first device 150 communicating a data file with an unauthorized second device 152 attempted to receive the pirated or unlicensed content. The node pairing software module makes copying the data file almost impossible, because the unique node identifiers corresponding to each unauthorized node device tend to be hard, if not impossible, to change. More particularly, the unauthorized node device 152 does not have the appropriate unique identifiers as the authorized node device 150. If this is the case, then the transmitted data file can either degrade as it is decrypted or the file may be unreadable from the start of execution.

FIG. 3 may also be used to present an illustrative peer-to-peer system embodiment or node-to-node implementation having a first node 150 and a second node 152 that are communicatively coupled to one another. In the illustrative embodiment, a node identifier request communicated from the second node 152 to the first node 150. A query is then performed at the first node 150 for at least one node identifier that is unique to the first node. The unique node identifier is then communicated from the first node 150 to the second node 152. An encrypted data file is generated by the second node 152. The encrypted data file is produced with an encryption algorithm that utilizes the unique node identifier to generate an encryption key. A node decryption key generated by the second node 152 and communicated to the first node 150. The encrypted data file is then communicated from the second node 152 to the first node 150. The encrypted data file includes the node decryption key for the first node 150, and decrypts the encrypted data file at the first node 150 with the node decryption key that corresponds to the first node 150. In operation, a node request is received to access the data file at the second node 152, and the node request is generated by the first node 150.

Additionally, the system may include a secure communication between the first node and the second node, wherein during the secure communication the unique node identifier is transmitted from the first node to the second node.

In yet another illustrative embodiment, the node decryption key generated by the second node 152 and communicated to the first node 150 includes a partial decryption key. A complete decryption key is then assembled at the first node 150 with the unique node identifier and the partial decryption key.

In still another illustrative embodiment, the encrypted data file for the first node 150 includes a plurality of inserted bits that are inserted into a plurality of data frames that correspond to the data file. In another embodiment, the encrypted data file for the first node 150 removes a plurality of bits from a plurality of data frames that correspond to the data file.

In yet another embodiment, the second node 152 receives the unique code identifier and the system modifies the encrypted data file after a period of time and modifies the node decryption key for the first node after the period of time.

In still another embodiment, a randomizing function configured to modify the encrypted data file and the node decryption key and the randomizing function is configured to determine when to modify the encrypted data file and the node decryption key, such that the period of time appears random.

The illustrative node-to-node embodiment presented in FIG. 3 may also include a watermark module that is embedded into the data file by the illustrative second node 152.

Additionally, a permutation key may be included that is configured to permute the watermark. The permutation key may also be changed so that the location of the watermark changes. Decryption includes enabling the first node to recover the watermark from the data with the permutation key.

The watermarking embodiment may also include using the watermark to detect that the second node transmitted the data file, and when the watermark does not correspond to the first node 150, the second node 152 interrupts transmission of the data file.

The watermarking embodiment may also include an invisible watermark configured to be embedded in at least one data frame that corresponds to the data file. Additionally, the watermarking embodiment may support splitting the data file into an audio stream and into a video stream. If the audio stream includes an invalid watermark that does not correspond to the first node, then the first node 150 is configured to modify the audio stream because of the invalid watermark.

The illustrative node-to-node embodiment presented in FIG. 3 may also include a block management unification system (BMUS) module 24 that communicates a data file between the first node 150 and second node 152. The block management unification system (BMUS) further includes having the second node 152 access the data file that is then divided into a plurality of blocks. A first rearrangement criterion rearranges the blocks and a first block encryption key inserted into the blocks. The BMUS module also includes a second rearrangement criterion that rearranges the blocks and a second block encryption key inserted into the blocks. Additionally, the BMUS module also includes a compression module that compresses the rearranged blocks and an encryption module that encrypts the rearranged blocks with the first block encryption key and the second block encryption key.

In the illustrative BMUS module embodiment, the first node receives the encrypted rearranged blocks and extracts the first block encryption key and the second block encryption key. Additionally, the first node may decrypt the encrypted rearranged blocks with the first block encryption key and the second block encryption key. Furthermore, the first node may be further configured to decompress the rearranged blocks and reconstruct the data file from the rearranged blocks.

In one illustrative embodiment, the first rearrangement criterion includes a randomizing module configured to divide the data file into a plurality of random blocks. In another illustrative embodiment, the second rearrangement criterion includes a pattern recognition module configured to generate a rearranged file that includes blocks with similar patterns.

In yet a further embodiment, a partial decryption key generated by the second node and communicated to a first node, and a complete decryption key assembled at the first node with a unique node identifier and the partial decryption key.

In a still further embodiment, the second node stores the data file, receives a request to access the data file from the first node, receives a user biometric, and communicates the encrypted rearranged blocks with the first block encryption key and the second block encryption key corresponding to the requested data file, after verifying the user biometric as a valid user.

Figure 4:
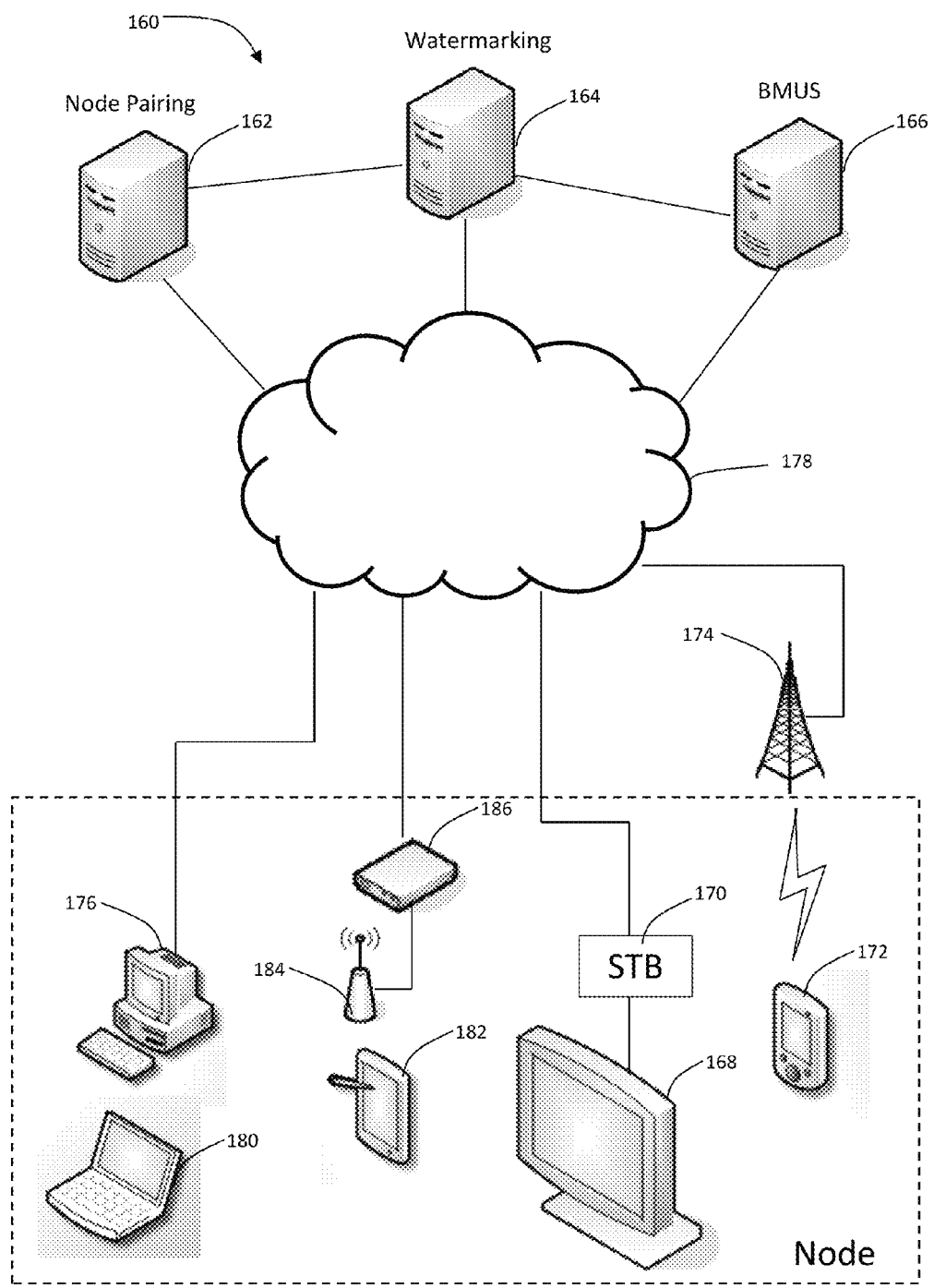
FIG. 4 shows an illustrative cloud embodiment, in which a plurality of servers perform the node pairing, watermarking, and block management operations presented.

Referring now to FIG. 4, there is shown an illustrative cloud embodiment 160, in which a server is dedicated to performing the node pairing, watermarking, and block management operations presented. In the illustrative cloud embodiment, a node pairing server 162 is configured to receive the data file and performs the node pairing 20 operations. A watermarking server 164 is communicatively coupled to node pairing server 162 and inserts watermarks into the data file. A block management unification system server 166 is also configured to receive the data file and separate the data file into blocks that are subsequently compressed. The block management unification system server 166 may also communicate with the node pairing server 162, the watermarking server 164, or the combination thereof.

In one illustrative embodiment, the servers 162, 164 and 166 communicate with a plurality of different node devices that include a television 168 or digital display 168, set-box 170 operatively coupled to the television. The illustrative node device may also include a wireless device 172 that communicates with a wireless network 174 such as a mobile phone, a wireless phone, a portable cell phone, a cellular phone, a portable phone, a personal digital assistant, wearable computers and other such wireless devices. Another illustrative node device includes a personal computer 176 that has an illustrative wired connection to the Internet 178. Yet another illustrative device includes a laptop 180 and a tablet 182 that are in wireless communication with an access point 184 that is communicatively coupled to a modem 186 that is communicatively coupled to the Internet 178. The wireless communications may include, by way of example and not of limitation, CDMA, WCDMA, GSM, UMTS, or any other wireless communication system that can communicate with a network such as wireless local area network (WLAN), Wi-Fi, WiMAX, a wide area network such as an intranet or the Internet, or a cable television network.

More particularly, the illustrative cloud service 160 may be embodied as one of four fundamental cloud service models, namely, infrastructure as a service (IaaS), platform as a service (PaaS), software as a service (SaaS), and network as a service (NaaS). The cloud service models are deployed using different types of cloud deployments that include a public cloud, a community cloud, a hybrid cloud, and a private cloud.

Infrastructure as a service (IaaS) is the most basic cloud service model. IaaS providers offer virtual machines and other resources. The virtual machines, also referred to as instances, are run as guests by a hypervisor. Groups of hypervisors within the cloud operational support system support large numbers of virtual machines and the ability to scale services up and down according to customers' varying requirements. IaaS clouds often offer additional resources such as images in a virtual machine image library, raw (block) and file-based storage, firewalls, load balancers, IP addresses, virtual local area networks (VLANs), and software bundles. IaaS cloud providers supply these resources on demand from their large pools installed in data centers. For wide area connectivity, the Internet can be used or virtual private networks (VPNs) can be used.

Platform as a service (PaaS) enables cloud providers to deliver a computing platform that may include an operating system, a programming language execution environment, a database, and a web server. Application developers can develop and run their software solutions on the PaaS without the cost and complexity of buying and managing the underlying hardware and software layers. With some PaaS solutions, the system resources scale automatically to match application demand so that the cloud end user does not have to allocate resources manually.

Software as a service (SaaS) enables cloud providers to install and operate application software in the cloud. Cloud end users access the software from cloud clients. The cloud end users do not manage the cloud infrastructure and platform that runs the application. The SaaS application is different from other applications because of scalability. Scalability can be achieved by cloning tasks onto multiple virtual machines at run-time to meet the changing work demand. Load balancers in the SaaS application distribute work over a set of virtual machines. To accommodate a large number of cloud end users, cloud applications may be multitenant and serve more than one cloud end user organization. Some SaaS solutions may be referred to as desktop as a service, business process as a service, test environment as a service, communication as a service, etc.

The fourth category of cloud services is Network as a service (NaaS), which allows the cloud service end user to use a network/transport connectivity services, an inter-cloud network connectivity services, or the combination of both. NaaS involves the optimization of resource allocations by considering network and computing resources as a unified whole, and traditional NaaS services which include flexible and extended VPN and bandwidth on demand.

Many cloud applications do not require specific software on the client device, and instead use a web browser to interact with the cloud application. With Ajax and HTML5, these Web user interfaces can achieve a similar or even better look and feel as native applications. Some cloud applications, however, support specific client software dedicated to these applications.

There are different types of cloud deployment models for the cloud-based service, which include a public cloud, a community cloud, a hybrid cloud and a private cloud. In a public cloud, applications, storage, and other resources are made available to the general public by a service provider. These services are free or offered on a pay-per-use model.

The community cloud infrastructure is between several organizations from a community with common concerns, whether managed internally or by a third-party and hosted internally or externally. Thus the costs are spread over fewer users than a public cloud (but more than a private cloud).

The private cloud infrastructure is operated solely for a single organization, whether managed internally or by a third-party and hosted internally or externally. A private cloud project requires virtualizing the business environment, and it requires that the organization reevaluate decisions about existing resources.

The hybrid cloud is a composition of two or more clouds (private, community or public) that remain unique entities but are bound together, offering the benefits of multiple deployment models. Hybrid cloud architecture requires both on-premises resources and off-site (remote), server-based cloud infrastructure. Although hybrid clouds lack the flexibility, security, and certainty of in-house applications, a hybrid cloud provides the flexibility of in-house applications with the fault tolerance and scalability of cloud based services.

Node Pairing

Figure 5A:
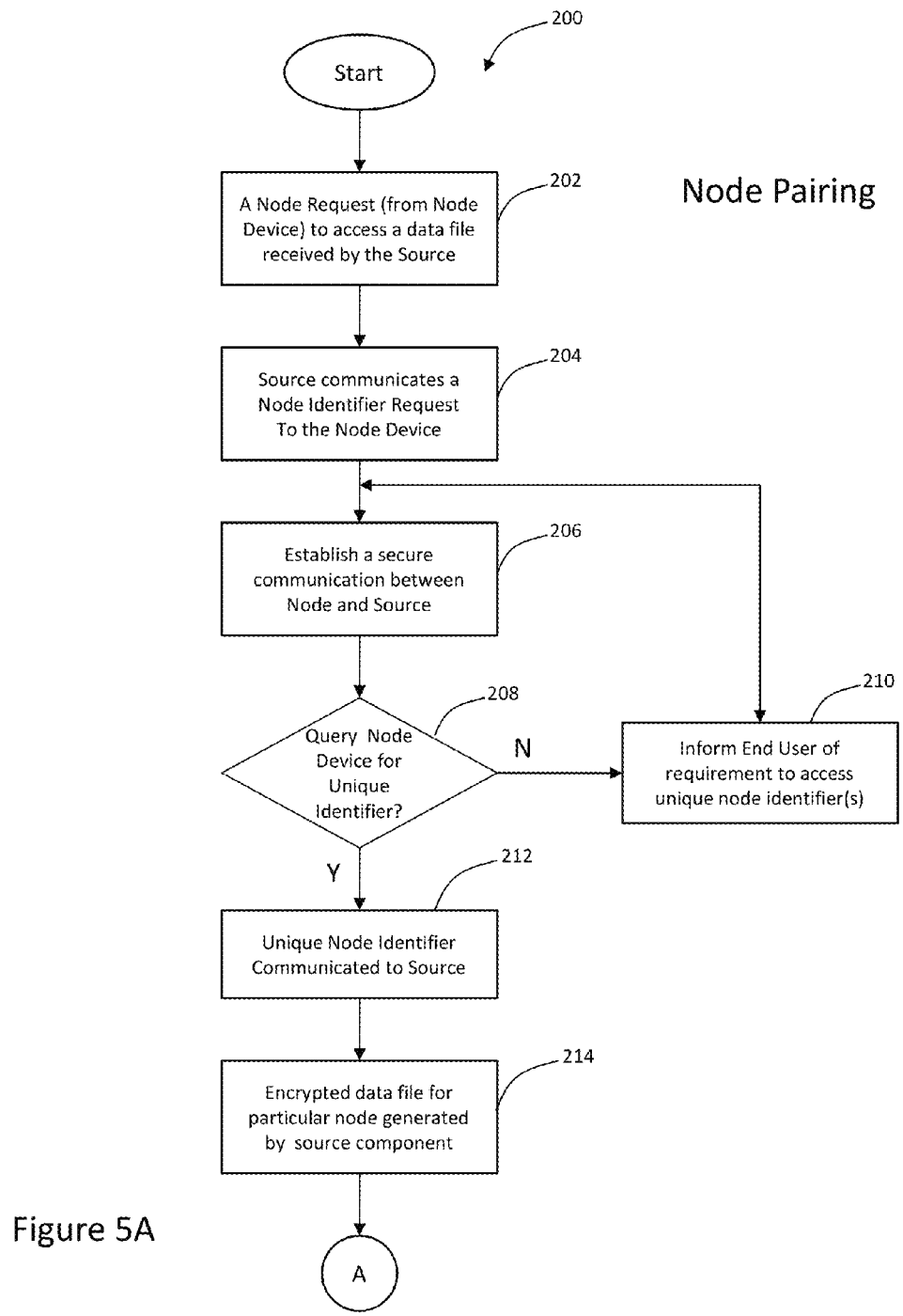
FIGS. 5A-5B shows an illustrative node pairing method for performing the secure transmission between the source component and the node device.
Figure 5B:
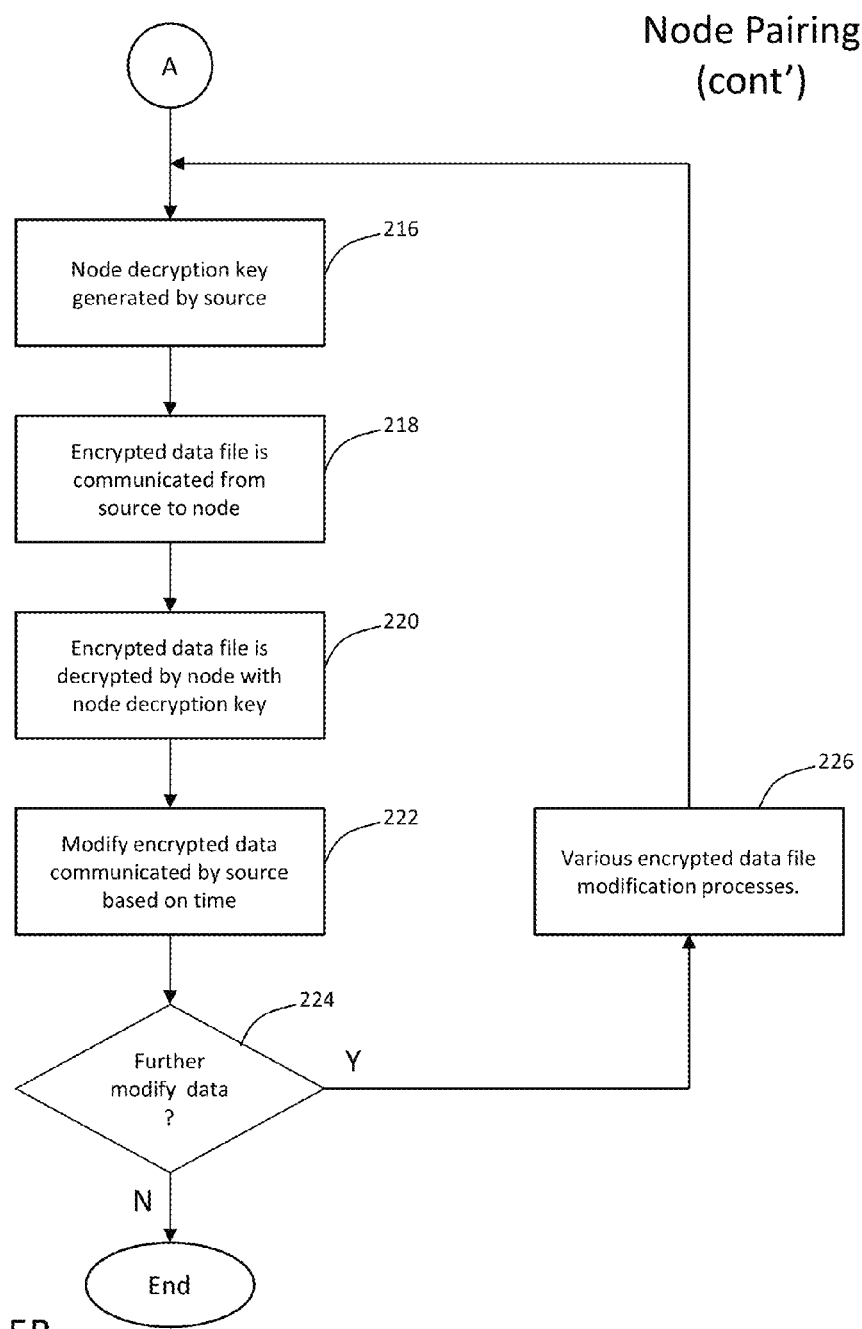

Referring now to FIGS. 5A-5B, there is shown an illustrative node pairing method 200 for performing the secure transmission between the source component and the node device. The method is initiated at block 202, where the illustrative source component 16 receives a node request from the particular node device 12. The node request provides a request to access the data file managed or controlled by the source component 16. At block 204, the source component 16 then proceeds to respond by communicating a node identifier request from the source component to the particular node. The method may then proceed to block 206 where a secure communication between the particular node and the source component.

In one illustrative embodiment of these initial process steps, a message "M" is transmitted from the source 16 to the node 12 and an encryption key is also communicated with the message. The message (M) is kept private and encrypted. By way of example and not of limitation, the illustrative message (M) may include a node identifier request that is generated by the source component 16 that is then communicated to node 12.

The encryption may include a cipher text, a selected cipher and a key that is used for the cipher.

$$S \underset{M}{\rightarrow} R$$

In order to keep the message (M) private, the illustrative embodiment encrypts the data, which is denoted by:

$$CT = E_{c,k}(M)$$

In the illustrative embodiment, CT is the cipher text, c is the selected cipher, and k is the key used for the cipher. Returning the original message is denoted by the decryption function such that:

$$M = D_{c,k'}(E_{c,k}(M))$$

The keys k and k' may, or may not be different, depending on the cipher.

At decision diamond 208, the method then proceeds to perform a query at the particular node for a node identifier that is unique to the particular node. The unique node identifier refers to every Node having one or more identification numbers associated with the computer system. These numbers include a Media Access Code (or "MAC address") $A_{MAC}$, a serial number $A_s$, a particular hardware configuration $A_h$, an IP address, and other such identifying numbers. The numbers that do not change or cannot change are used to identify the particular node.

If there is no unique node identifier, the method proceeds to block 210 where the end user is informed of the need to access the unique node identifiers. The end user may then elect to provide the source component 16 with the ability to access the unique node identifier.

If the node query is successful at decision diamond 208, the method proceeds to block 212 where the unique node identifier is communicated to the source component 16. An encrypted data file for the particular node is generated at block 214 by the source component 16, wherein the encrypted data file is produced with an encryption algorithm that utilizes the unique node identifier to generate an encryption key.

By way of example and not of limitation, the encrypted key is a key ($k_f$) that is selected by some function $f_K(A_{MAC}, A_s, \ldots A_h)$ is dependent on one or more unique node identifiers. While the key can still be discovered and recovered, the systems and methods presented herein calculate the key at the time of playback directly from the computer chip. The key is then a function of the unique identifiers of the chip. Even if the key is recovered and shared, all of the unique identifiers must also be duplicated. The values unique to the chip can only be recovered when read, assuring that the calculated key is unique for each chip. In this manner, the encryption is customized for the chip. The transfer of the message are shown by:

$$S \xrightarrow{f_K(A_{MAC}, A_s, \ldots, A_h)} N$$

Since at least one of the unique identifiers is hardwired into the chip, for any two chips $ic_1$ and $ic_2$, $k_f(ic_1) \neq k_f(ic_2)$. Thus, the more unique identifiers that are available, the harder it is to replicate the key at the receiving end of the transmission.

For each of the unique values in the key calculation the probability of selecting the correct value ($p(x_i=k_i)$)

$$p(x_i = k_i) = \frac{1}{|x_i|}$$

and the probability of finding the correct key from n unique identifiers (v), assuming no equivalent keys (isomorphs), is:

$$v = \prod_{i=1}^{n} p(x_i) = \prod_{i=1}^{n} \frac{1}{|x_i|}$$

Since unique values tend to be hard, if not impossible, to change in a machine or on a chip, the typical end user is not able to change most of the unique identifiers, even if it is physically possible. In most cases even attempting to change the values of the unique node identifiers results in significant damage to the electronic device that may be permanent.

At block 216, a node decryption key for the particular node device is generated at the source component, wherein the node decryption key is generated with the unique node identifier. The method then proceeds to block 218 where the encrypted data file is then communicated from the source component to the particular node, wherein the encrypted data file includes the node decryption key for the particular node.

In operation, the unique node identifiers are resolved into the encryption key and the data file is transmitted to the node as:

$$S \xrightarrow{f_K} N = E_{c,k}(M)$$

or the encrypted data file. Any data file so transmitted is stored in the encrypted format and requires decryption each time the data file, e.g. program content, is executed. Unless the particular node that executes or opens the data file has the same unique identifiers, then an incorrect key is formed at the time of execution that results generated a decrypted data file that either degrades as it is decrypted or is unreadable from the start of execution. Note that even if most of the encryption key is correct, the file decryption will degrade when the data file is executed.

The method then proceeds block 220 where the encrypted data file is then decrypted at the particular node with the node decryption key that corresponds to the particular node. In one illustrative embodiment, the node decryption key is embedded in the encrypted data file.

In another illustrative embodiment, the node encryption key generated by the source component 16 and communicated to the particular node 12 includes a partial decryption key. A complete decryption key is then assembled at the particular node with the unique node identifier and the partial decryption key.

At block 222, the method may further include modifying the encrypted data file after a period of time and then modifying the node decryption key for the particular node after the period of time.

At decision diamond 224, a decision may be made to further modify the encrypted file, which is further represented by block 226. By way of example and not of limitation, the data file may be transmitted or broadcast by combining node pairing 200 with watermarking 22 and the block management unification system 24 or any combination thereof.

Additionally, other processes may be implemented to further modify or encrypt the data file including, but not limited to, various encryption data processes that include enabling a randomizing function to modify the encrypted data and the node decryption key, wherein the randomizing function determines when to modify the encrypted data file and the node decryption key, such that the period of time appears random.

Further modifications to the data file may include removing bits from a plurality of data frames corresponding to the data file. Further yet, the method may also include generating the encrypted data file for the particular node at the source component and inserting bits into a plurality of data frames corresponding to the data file.

There is a need to continually modify the data file and the corresponding data frames, because placing data in the same location in a data structure allows an attacker to be able to locate the data and filter the data out for use. Therefore, moving the data in the data frame is required. The moving of data corresponding to either the data frame, the data file or any combination thereof may also be referred to as randomizing data interleaving.

The methods presented herein may also be applied to the illustrative peer-to-peer system embodiment of FIG. 3 above, in which a node-to-node implementation is described and the particular node 12 corresponds a first node 150 and the source component 16 corresponds to the second node 152. The system and method of operation for the node-to-node implementation is similar to the source component communications with the particular node presented herein.

Randomizing Data Interleaving

An illustrative randomizing data interleaving embodiment includes an encrypted data file modification process that places a picture into a data file that includes a plurality of data frames. The illustrative data file may be audio-video programming content generated distributed a cable television network—so the data file may be composed of a plurality of data frames that represent a plurality of video frames. The technique of placing a picture into the illustrative video frame is known as "steganography."

In the illustrative steganographic embodiment, a picture is added to a video frame. By way of example and not of limitation, the video data file uses an encoding scheme with an 8-bit color value that is referred to as "bit layer encoding" that encodes the intensity of the blue, red, and green components of color. The two least significant bits (LSB) of each layer, as well as the 3rd LSB of the blue layer, carry so little information that changes to the color of a pixel can be replaced with random bit values with almost no visible change to the picture. Thus, these random bit values are ideal for inserting data messages that appear invisible to an observer. Note, that the data file with these random bit values can also be captured by a video camera without compromising the data file.

In the bit layer encoding embodiment, the data file may be further modified using a variety of different methods, including but not limited to, linearization of the bit layers and appending the bit layers together. Linearization, in the context of node pairing, refers to taking a message and listing it from start to finish. The message may be a file set out in the same manner. If the item being linearized is a structure, then the first symbol is the upper left and the listing proceeds from left to right, top to bottom.

The bit layer encoding embodiment may also include randomized data that replaces data in the data frame, and then the appropriate number of bits is removed from the linearized layer data. However, if the data is not removed, then it is possible to count the number of bits and determine how many randomizing bits are added to each frame.

The bit layer encoding embodiment is also configured to append the randomization data to the end of the linearized layer data, and may then proceed to permute the data of the layers and the randomized data. As long as the permutation order is recorded, a reverse permutation will recover the data in the correct order. A permutation cipher and key could be used, among other methods, to achieve the interleaving of the data. Data that is embedded in the frame may be used in full, in part, or even ignored.

Assuming that all of the embedded data is recovered and is available for examination, the order in which the data is reconstructed and used is important. This can also be seen as a permutation of the interleaved data with the characters in that data. The number of possible interleaved bits is dependent on the number of inserted bits or the number of replaced bits. Assuming the technique for interleaving is replacing bits in the frame, then the number of bits ($b_r$) is:

$$b_r = \frac{7}{3} h \times w$$

where h and w are the height and width of the video screen. The number of possible permutations is maximized if all bits are used, and is:

$$b_r!$$

with the total number of possible insertions ($i_p$) is:

$$i_p = \sum_{i=1}^{b_r} i!$$

However, if the number of inserted bits technique is used for interleaving randomizing data the bounding may be much higher. Assuming that the file being protected consists of at least one character, then the amount of inserted data can be up to the file size minus the data required for a single video frame, $b_r \leq |F| - (h \times w)$. The number of possible data interleaving combinations can be calculated. It should be noted that in both cases isomorphs almost certainly exist. In fact, about half of the combinations are thought to be isomorphs, resulting in a total possible solution space reduced by half, since $p(xi=1) \approx 0.5$.

Of course, data can still be inserted in any type of data file. Files with regular structures are much easier to analyze and reconstruct the randomizing data they contain. However, for more dynamic file structures and data this is much more difficult. For such a file the number of possible interleaved randomization characters are one character less than the file size, $b_r \leq |F| - 1$. While this situation is not likely, it is still difficult to reconstruct the amount and order of randomization data, even counting isomorphs.

The advantage of including randomization data and changing control parameters or keys based on that data is the degradation of data. Misreading a single bit has the possibility of "cascading" and causing future selections to be incorrect, with the same probability.

Assuming that the inserted data is guessed, the equivalent of a brute force attack on the interleaved data, then there is a probability of $p(x=1)=0.5$ of getting the correct bit value in the correct place, or a probability of:

$$p(\vec{x}) \approx 0.5^B$$

where $\vec{x}$ is the correct sequence of interleaved bits in the frame and the number of bits in the interleaving is B. For any bit in the interleaved data that is wrong, there is also a probability of cascading errors of:

$$p_e \approx 0.5$$

and a variable probability of decay:

$$p_d \propto lg(|B|)$$

Increasing the speed of degradation through cascading errors can be done by reading watermarks, as describe below, in the file and then acting on damaged or missing watermarks. Using a selection function for watermarking makes it possible to increase the decay by triggering an overwrite of the file such that:

$$pix_i = rand(b_i)$$

wherein the value of pixel $pix_i$ is randomly selected for all bits in the file or frame. The effect is that the probability of change is as shown above or about ¼ of the bits will change each frame, including those that control the base colors. In turn this will cause decryption key errors, because interleaved data will also change. The result is a quickly degrading viewing experience that accelerates the decay of the file. Pictures will seem to explode with random colors and the program will be unreadable.

Randomizing Functions

As with most encryption or reordering functions, randomization functions are also significant. Information theory indicates that redundancy should be avoided if possible. Creating a function (($f(x)$) that avoids predictability requires one that is both asymmetrical in its period and sufficiently long to exceed the entropy in the message, or portion of the message, encrypted.

Most common keys are selected and then used for the entire length of the message, if not for many messages. Modern cryptography teaches that the bigger the key, the larger the key space, and consequently the more secure the message. There are, however, flaws to this general line of analysis. First, not all keys result in unique encryptions. This may be due to limited characters used in the message. The entropy of a message determines how much information is needed to break that message. Most decryption techniques are not able to break an encryption at the theoretical minimum for an encryption. Normally it requires from 200-500 times that number (the unicity distance) in order to have a reasonable chance at recovering the message.

One way to vary things is known as the One Time Pad, or OTP. OTPs were originally called "Vernam ciphers." In this type of encryption every character in the message is given its own key and/or cipher. The technique of varying the key is instructive, but it requires governments and large corporations to be able to afford the process and its overhead. If the key is changed on an irregular basis, then more characters are sent using the same key. If the key is changed on a calculable schedule, it is then possible to attack the encryption via the function that selects the keys. Therefore, a randomizing function whose values change over the duration of the message is needed.

Random events are both the love and bane of cryptographers. Cipher and random function designers strive for true randomness, but even proving randomness is difficult. Some functions are known and have been proven to be random.

Calculating those functions is not possible, so a function with a long periodicity, compared to the message, is required. One such way of doing this is to create a function that describes something similar to the waves in the ocean. In that case the frequency of waves (w(t)) is due to a number of factors—regular natural phenomena (such as tides, $w_n$), irregular natural phenomena (such as wind, $w_d$), extraordinary events (such as man-made events like boats sailing), and reflections off of obstructions (both man-made and natural) that dies off over distance and time according to the function $f_d(t,l)$. That is:

$$w(t) = \sum_{i=1}^{n} w_n(t) + \sum_{j=1}^{m} w_d(t) + \sum_{q=1}^{p} w_m(t) + f_d(t, l) \sum_{v=1}^{x} w_r(t)$$

assuming that all perturbations are accounted for from the beginning of time. After a sufficient amount of time, waves can be dropped from consideration, depending on the rate at which they are dampened.

The main problem with using such an algorithm is that sine waves are well understood. Other similar periodic waves can be added to help changes the regularity of the system and cause what appear to be discontinuities at various points in the wave flow. Adding different wave functions also allows for adding or subtracting offsets in the period. However, it is important to ensure that the period of the different waves are not integer multiples of each other. That is, for two waveforms $w_i$ and $w_j$ with the associated wavelengths $\lambda_i$ and $\lambda_j$, $!\exists(n\in\|)$ $(i\neq j)|n\lambda_i \neq \lambda_j$ where $\lambda_i \leq \lambda_j$.

Other candidates for inclusion in the randomization function are the unit step function, ramp function, and triangle wave. Of the three, the ramp and triangle wave functions are similar, so only one should be included. The ramp function is most like the unit step function, in that it monotonically changes where the triangle wave is more like the sign wave in that it changes in both the positive and negative directions. Choosing the ramp function is easier to deal with mathematically, so it was chosen for inclusion.

The unit step function $u(t_i)$ is described by the equation:

$$u(t_i) = \begin{cases} 0, & \text{if } t < t_i \\ 1, & \text{if } t \geq t_i \end{cases}$$

If added to a waveform there is a sudden jump to the total value of the function of $f(s)u(t_i)$ at time $t_i$, where $f(s)$ represents some scaling function associated with the unit step function. That is to say, the change in the function is not restricted to unity. Nor is it required that $f(s) > 0$. The effect may be a subtraction from the summed wave, as well as an addition.

Similarly, an instantiation of a ramp function can also cause a gradual rise in the same way. The ramp function $r(w_i, t_i)$ is described by the equation:

$$r(w_i, t_i) = \begin{cases} 0, & \text{if } t < t_i \\ \dfrac{t - t_i}{w_i - t_i} & t_i \leq t \leq t_i + w_i \\ 1, & \text{if } t \geq t_i + w_i \end{cases}$$

Randomizing using these component functions requires choosing a value between ±m for cyclic functions that can be mapped as limits for a pseudo random number generator (PRNG) used in standard software languages. Three approaches are possible. The first is to consider each application of a new wave pattern and normalize the effect to the range of the number of functions applied between time 0 and $t_i$. That is, let:

$$f(s) = \frac{m}{|w_i|}$$

or give each wave the weighting of the number of waves that are active at the point in time ($|w_t|$) described by s.

The second approach is to replace $|w_t|$ by the total number of waveforms over time, $|w_t|$ so that the discontinuity is normalized over all time. This changes the formula to:

$$f(s) = \frac{m}{|w_t|}$$

Finally, the third approach is to decide on some weighting function $K_x$ that allows for normalizing each wave function separately and not necessarily equally. If this approach is taken as the general approach, then a general form of the combined randomization function is given by:

$$p(t_i) = \frac{K_s}{a} \sum_{i=1}^{a} \sqrt{-1}^{2m_i s_i} \sin\omega_i(t) + \frac{K_u}{b} \sum_{j=1}^{b} \sqrt{-1}^{2m_j u_j} u(t_j) + \frac{K_r}{c} \sum_{i=1}^{c} \sqrt{-1}^{2m_k r_k} r(w_k, t_k)$$

which has a periodicity of:

$$\lambda = 2 \prod_{i=1}^{n} \omega_{max} m_{max} r_{max} s_{max} u_{max}$$

assuming that $\omega_{max} m_{max} r_{max} s_{max} u_{max} \in \mathbb{P}$. In this equation, the use of the terms of the form $$\sqrt{-1}^{2m_j u_j}$$

allows a waveform to be added and subtracted over time, creating further discontinuities that appear to be random. It also allows for additional degrees of freedom to be added into a calculable function for obscuring the nature of the waveforms and location of exact transitions. These functions are also well known and characterized, as well as each to calculate on the fly.

If the size of the message ($|M|$) is known, then the goal is to achieve a periodicity ($\lambda$) such that:

$$\lambda \leq |M|$$

Although it is preferable that for each type of function, denoted by f(x), that coefficient also have the property $\forall x_i \in f(x) \rightarrow x_i \in \mathbb{P}$, it is not required. Further, it is also desirable that if the coefficients are not all prime numbers, that the coefficients not all be integer multiples of the maximum coefficient. That is, $\forall x_i \in f(x)$ $$x_{max} \bmod x_i \neq 0$$

If the size of the message is not known at the beginning of the encryption process an arbitrarily large number can be assumed. A message larger than the assumed number can then be treated as if it were a series of smaller messages whose size (|M−i|) is smaller than λ. In that case, all that has to be done is to reset the factors using a Diffie-Hellman exchange to agree on a new set of parameters, and then continue the encryption with the new parameters and reparameterize as needed. Naturally, a list of prime numbers that can be used as parameters will speed reinitializing things up. Values chosen from that list should be randomly selected with a unique mapping employed.

Seeds for the PRNG are then selected by calculating the function at time s. This does not guarantee unique values at any two times, $s_i$, $s_j$ where i≠j, but it does randomize the seed value, especially if there is fine granularity in the function. Randomization is used as the seeding value.

Watermarking

Watermarks are an identifying message embedded in a frame, program, or file. Video watermarks are common watermarks that are embodied as a picture or logo added to a video program in one corner that identifies the company (or channel) that is transmitting the program for public consumption. In some cases, a watermark is added to make reproduction of the program less desirable than purchasing a licensed copy of the program. In other cases, a watermark is used to identify the source of the program in case of illegal retransmission. However, a watermark does not have to be visible to be effective. Generally, invisible watermarks are more effective if the watermark is to be used as a means of establishing identity and progression of possession. Invisible watermarks are typically disguised by placing them somewhere that the data comprising the watermark will not be noticed.

Figure 6A:
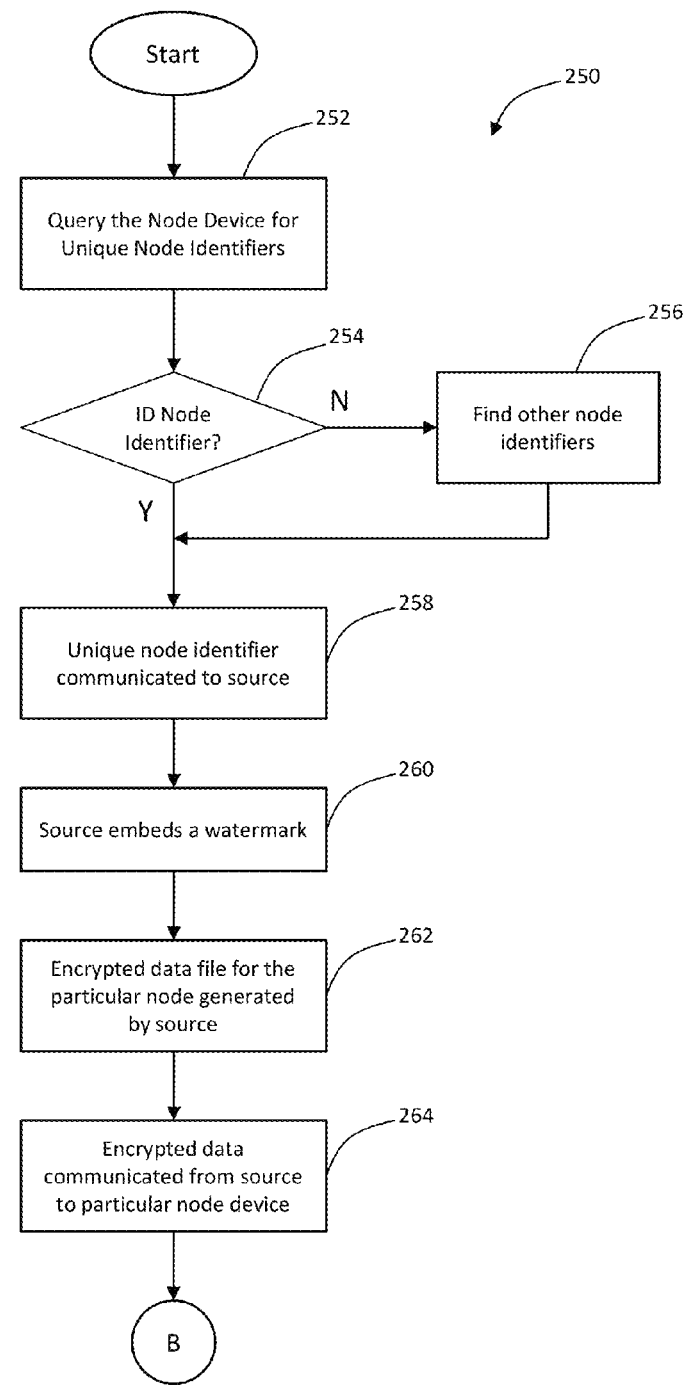
FIGS. 6A-6B shows an illustrative watermarking method for embedding a watermark into a data file that is communicated to a particular node from a source component.
Figure 6B:
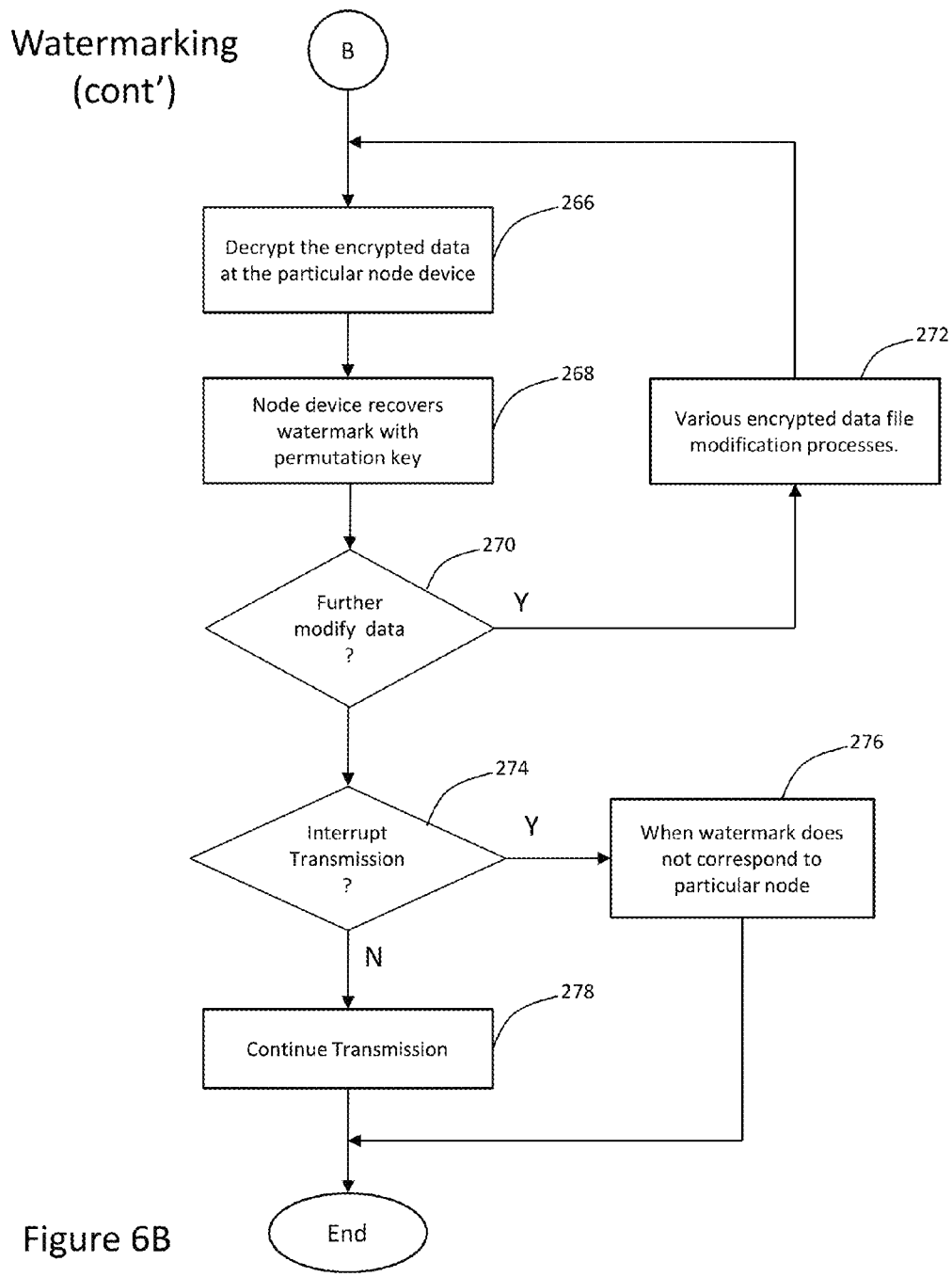

Referring to FIGS. 6A-6B, there is shown an illustrative watermarking method 250 for embedding a watermark into a data file and communicating the data file to a particular node from a source component. As presented herein, the watermarking module 22 embeds a watermark into the data file that is communicated by the source component 16. The watermark changes location in the data file and the particular node 12 recovers the watermark from the data file.

At process step 252, the method includes performing a query at the particular node device for unique node identifiers that correspond to the particular node, as described above. At decision diamond 254, the determination is made whether the node identifier has been identified and if the watermarking module is unable to access particular node identifiers from a client device. The watermarking module 22 may proceed to utilize other node identifiers such as a MAC ID for a wireless access point or a MAC ID for a modem. Thus, although not directly accessing the query is not directly accessing the client device, the watermarking module 22 may access the unique identifiers that are associated with the particular node device, namely, the local area networking identifiers used to access the Internet. Similarly, the process step 256 may also be applied to the node pairing module 20 and the block management unification system module 24 described in this patent. At process step 258, the unique node identifier is then communicated from the particular node to the source component.

The source component embeds a watermark into the data file at process step 260. Additionally, the watermark is permuted with a permutation key, and the permutation key in the data file may change so the location of the watermark changes. In another illustrative embodiment, the watermark includes an invisible watermark configured to be embedded in at least one data frame corresponding to the data file.

At process step 262, an encrypted data file for the particular node is generated at the source component. The encrypted data file is produced with an encryption algorithm that utilizes the unique node identifier to generate an encryption key.

At process step 264, the encrypted data file from the source component is communicated to the particular node. The encrypted data file includes a node decryption key for the particular node and the permutation key for the watermark.

The encrypted data file is decrypted at the particular node at process step 266 with the node decryption key that corresponds to the particular node. In one illustrative embodiment, the node decryption key is embedded in the encrypted data file.

In another illustrative embodiment, the node encryption key generated by the source component 16 and communicated to the particular node 12 includes a partial decryption key. A complete decryption key is then assembled at the particular node 12 with the unique node identifier and the partial decryption key.

At process step 268, the particular node proceeds to recover the watermark from the data file with the permutation key.

At decision diamond 270, a decision may be made to further modify the encrypted file, which is further represented by process step 272. These process steps are similar to decision diamond 224 and block 226 presented above. As described above, other processes may be implemented to further modify or encrypt the data file including various encryption data processes that include enabling a randomizing function to modify the encrypted data and the node decryption key. Further modifications to the data file may include removing bits from a plurality of data frames corresponding to the data file. Further yet, the method may also include generating the encrypted data file for the particular node at the source component and inserting bits into a plurality of data frames corresponding to the data file.

Additionally, the data file may be split into an audio stream and a video stream. Furthermore, the illustrative method may receive an audio stream that includes an invalid watermark that does not correspond to the particular node device, and the particular node device modifies the audio stream because of the invalid watermark.

At decision diamond 274, a determination may be made to interrupt the transmission, when a watermark is found to not correspond to a particular node, as described in process step 276. However, if the appropriate watermark corresponds to the particular node, the transmission is not interpreted as shown in process step 278.

The methods presented herein may also be applied to the illustrative peer-to-peer system embodiment of FIG. 3 above, in which a node-to-node implementation is described and the particular node 12 corresponds a first node 150 and the source component 16 corresponds to the second node 152. The system and method of operation for the node-to-node implementation is similar to the source component communications with the particular node presented herein.

In a more detailed illustrative watermarking embodiment, a source component records the color or color and intensity of each picture element, or "pixel," of an illustrative video file. If the value for each pixel is encoded in binary and a matrix is made for the values of each weighted binary bit is taken as a group, then the values can be viewed as a whole. That is, let a pixel be represented by three base colors, red (R), green (G), and blue (B). Each color has an intensity represented from $0 \le x \le 2^{|b|}$, where |b| is the number of bits in the intensity encoding. For current encodings, the number of bits is almost always at least 8 bits. In the future, this should continue to increase. This type of encoding is known as "bit layer encoding," or BLE.

Assume that current video formats use 8 bit BLE to describe a pixel. The human eye is not able to distinguish variations in colors for more than 6 bits in any of the color domains. Blue color sensitivity is even lower than that for R and G, generally standing at 5 bits. Therefore, the 2 least significant bits (LSBs) of each color are effectively indistinguishable. The same can be said of the 3rd LSB of the B layer. Messages can be placed in the bits of those layers and will be invisible to the human eye. This provides the means to place a watermark in a picture.

Any watermark that can be encoded and whose size is less than:

$$|w| \leq 7 l_p h_p$$

where $l_p$ is the width (in pixels) and $h_p$ is the height (in pixels) of the frame. Placing the watermark in the frame and leaving it in the same place in the frame, a static watermark, can be found and recovered by applying a simple modified intersection function:

$$l_w = \bigcap_{i=1}^{\wedge n} F_i$$

where:

$$\bigcap_{i=1}^{\wedge n} = \begin{cases} b_i, & \text{if } b_i = b_j \\ x & \text{otherwise} \end{cases}$$

on the average it will take:

$$|F| \approx lg|l_w|$$

operations to find the watermark.

Unfortunately, a watermark that stays in the same place from frame to frame can be identified and attacked using this approach. Once identified, a simple filtering program can be written to randomly select a new bit value for each of those bits. This program is known as "scrubbing" the watermark. If the replacement uses a probability of p(x=1)=0.5 to make the replacement, the probability of the watermark retaining intact is:

$$p(l_w) = \frac{1}{2^{|l_w|}}$$

Scrubbing does not affect the video as long as the bit replacement value replacing the data is random. Preventing scrubbing requires that multiple copies of the watermark be placed in the frame and that the locations of the watermarks be randomized and moved throughout the frame. Inserting the watermarks in the frame is equivalent to a permutation cipher (or any other equivalent function) using a random key and permuting the watermarks in their various forms into the combined BLE representation for the correct layers of each color. Let $X_i$ be the $i_{th}$ LSB for the X color. Further, let BLE' be the following bit layers concatenated together:

$$BLE'=B_3\|R_2\|G_2\|B_2\|R_1\|G_1\|B_1$$

A permutation key ($K_p$) is constructed for a block the size of |BLE'|. The first $|l_w|$ substitutions are then made using a mapping of:

$$l_w \rightarrow BLE'$$

This mapping allows for substitutions in any order and produces a possible number of mappings given by:

$$|K| = \binom{|BLE'|}{|l_w|}$$

The key changes for every frame. Therefore, the total number of possible watermarks for |F| frames is $$|K_f| = |K|^{|F|}$$

If the watermark includes the identification of the stream and the frame number, then the watermark is easily recovered. This identification may be encrypted or may be made in plaintext. The number of watermarks can also be varied to further compound the problem of finding and scrubbing all watermarks from the video. This is applicable for any BLE combination now and in the future.

Watermarking is not limited to video files. Audio files can also be provided with invisible (or inaudible) files. One possible extension to watermarking is to interpret watermarks that do not correspond to the node that the file is paired to as a high pitched tone that is irritating to human listeners. In this case a signal is added to the audio mix, and a tone that is based on the embedded watermark is subtracted from the base frequency in order to create a new frequency.

Let the base program be represented by:

$$p_p = \sum_{i=1}^{n} A \sin(\omega_i t)$$

where $\sin(\omega_i t)$ represents the sound from the single source i. The source may be an instrument, voice, or any other source contributing to the final sound. Further, let:

$$\omega = \sin(\omega_\lambda t)$$

where $\omega_\lambda$ is a frequency selected due to its ability to annoy the listener. Therefore, with the watermark added, the audio program ($p_a$) is described by:

$$p_a = p_p + B(w - w_d)$$

where $w_d$ is the waveform derived from the node pairing. The difference between the two waveforms creates a beat frequency oscillator (BFO) whose frequency is:

$$w - w_d = B \sin(\omega_\lambda - w_d t)$$

If the frequency of the BFO ($\omega_{BFO}$) is in the audible range:

$$300 \leq \omega_{BFO} \leq 20{,}000$$

then an audible sound is added to the program. The sound can vary or stay in the same range. In either case, it will be detectable and may degrade the listening experience. If a continuous tone is desired, then the watermark can be created to return a constant value if incorrect. That constant value (K) can be then used to produce the tone by inserting it into the modified BFO equation as:

$$(w+K) - xK = B \sin(\omega_\lambda - xK)t$$

where x is defined as:

$$x = \begin{cases} 1, & \text{if watermark is correct} \\ 0, & \text{otherwise} \end{cases}$$

Files that display characters as part of their output can embed watermarks by varying the space between words or the height that a character is located with respect to the horizontal spacing from line to line. An offset of Δ indicates a bit with a value of "1" and no difference is a value of "0." There are some limitations to this method. If a vertical offset is added to the character, then this can only be read if the character is not a blank space. No such limitation is imposed for difference in horizontal spacing. The intent is to add offsets can are small enough to pass for the normal variation in printing and are virtually undetectable to the human eye. This method has the advantage of remaining detectable either in the electronic version or when reproduced. Care must be taken when justifying text to ensure that the justification retains the offset and conforms to the proper offset.

There exist quantized vertical spacings, $|s|+\Delta$, $2|s|+\Delta$, where $s \in \{s, 2s, s_{j,1}, \ldots s_{j,n}\}$ that act as quantized distances for quick comparison that determine the bit value of the embedded bit at that character location. For a character spacing (a) a logic '0' occupies the area $ns-\Delta \le a \le ns$ while the logic '1' occupies the space $ns \le a \le ns+\Delta$. To add a bit of a buffer the offset for the bit can be adjusted to $(-1)^b \Delta/2$, where b is the value of the bit being encoded.

Block Management Unification System

Figure 7A:
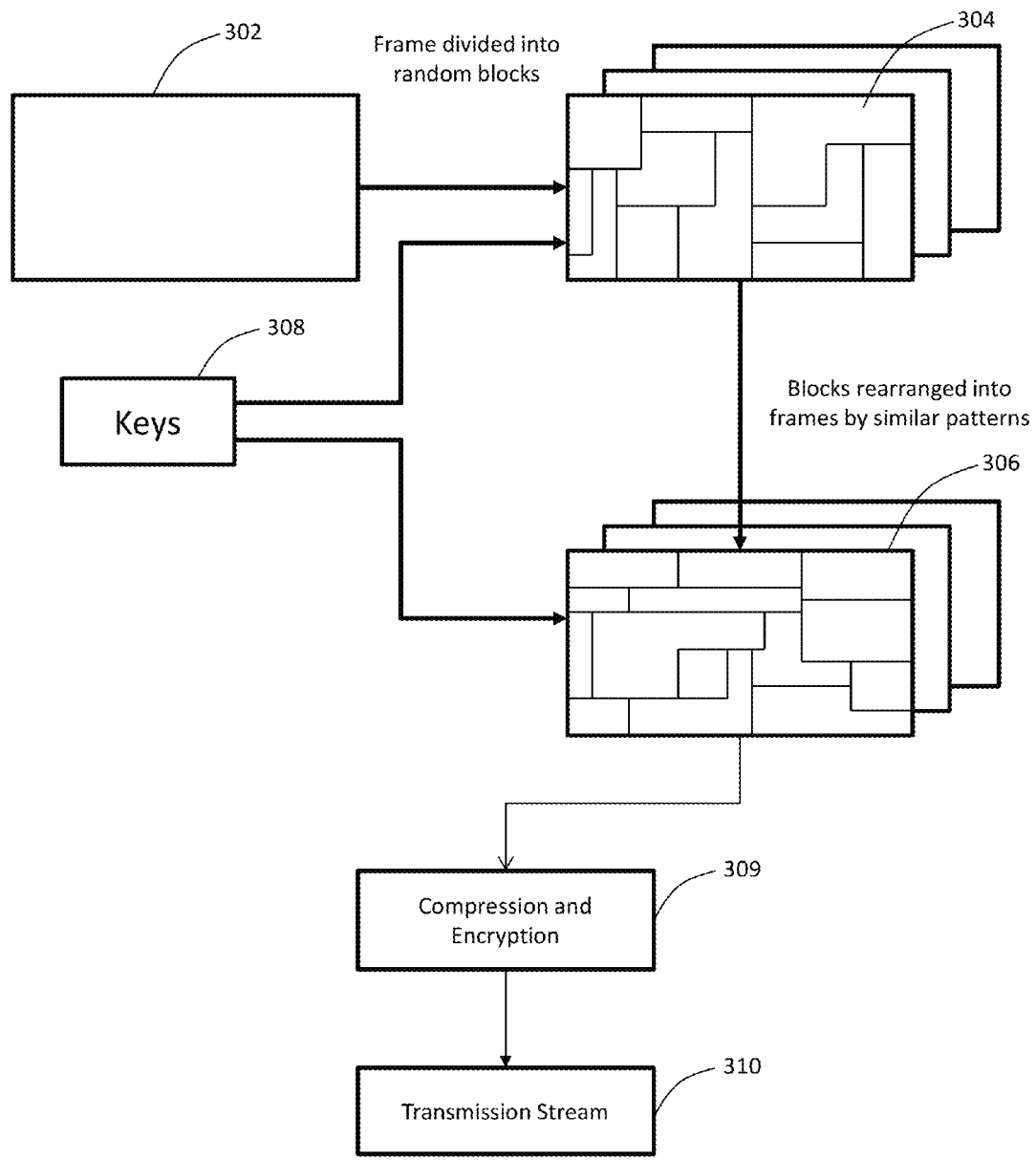
FIGS. 7A-7B shows an illustrative block diagram of operations performed by the block management unification system module.
Figure 7B:
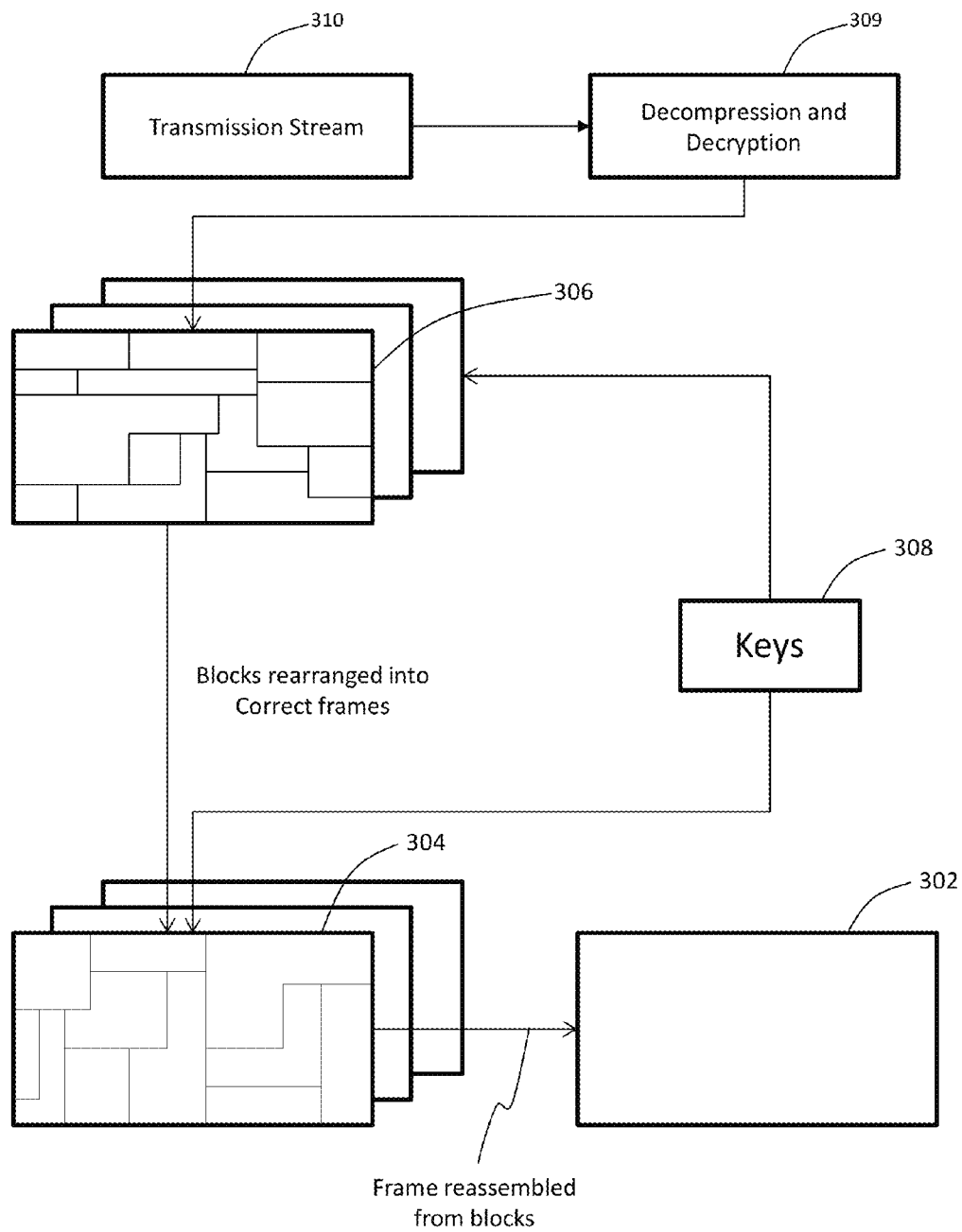

Referring to FIGS. 7A-7B, there is shown an illustrative block diagram of operations performed by the block management unification system module. In the illustrative embodiment presented in FIG. 7A, an original data file 302 is reduced (e.g., divided) into blocks 304. The method for dividing the original data file 302 into blocks 304 may be fixed, randomly selected, user-selected, selected dependant on the type of file that is being processed, or the like. Put another way, the program instructions executed by the data processor 114 to carry out a method according to an embodiment of the present invention may have a single, fixed method for dividing an original data file 302 into blocks 304, may randomly select a method for dividing an original data file 302 into blocks 304, may select a method based on user input, may analyze the original data file 302 and select a method based on that analysis, or the like.

The keys 308, for dividing the original data file 302 into blocks may take any form. For example, an original data file 302 may be split by random block size, based on a pattern within the file, or the like. In one such example, a video file could be divided by color, object, or randomly boundaries within the frame. It is contemplated that, although FIG. 7A illustrates a rectangular original data file 302 and linear blocks 304, neither the original data file 302 nor the blocks 304 nor the reassembled file 306 need to be rectangular or linear in shape. For example, an original data file 302 could be modeled as any number of geometrical shapes, including a rectangle or other polygon, an ellipse, or the like. The shape used affects the location and types of patterns found in the original data file 302 that is modeled.

The location of each block is identified. In another embodiment each block is identified by number as to its location in the file. This permits reassembly of the original data file 302 after further processing, as described below.

The divided original data file 302 contains a plurality of blocks 304. These blocks 304 are then rearranged to form a reassembled file 306. The method of rearrangement may take any form. In one embodiment, the object of file reassembly is to attempt to aid in the compression of the reassembled file 306, and to mix the order of the constituent blocks to provide another layer of processing to frustrate reconstruction of the original data file 302.

In one example, the blocks 304 may be evaluated for efficiency of compression and assembled into a reassembled file 306 based on the efficiency evaluation. Additionally or alternatively, blocks 304 may be randomly ordered. It is contemplated that any other method for ordering the blocks 304 in a reassembled file 306 may be used.

As with the method for creating blocks 304, the keys 308 for reassembling blocks 304 into a reassembled file 306 may be fixed, random, user selected, selected based on an analysis of the file, or the like. In any case, a block location data file 302 is created to guide reconstruction of the original data file 302 from the reassembled file 306, as presented in FIG. 1B. In one such optional embodiment, the order, size, and geometry of the blocks is appended to the front of the reassembled file 306. It is contemplated that the reassembled file 306 may not share the characteristics of the original data file 302.

In another embodiment, an original data file 302 may be processed prior to formation of blocks. In one such optional embodiment, a preprocessing step may locate and isolate objects in a file. For example, the objects could range from those objects in a picture that can be identified and classified as an object recognizable to humans, to a portion of the file that follows a defined rule or pattern. Each such object may be identified and the boundaries of each object may be marked in a map of the original data file 302. Objects may also be identified with the rule(s) or pattern(s) that they exhibit. Objects may be grouped to produce efficient compression. The remainder of the data in the original data file 302 may be separated into geometric shapes for further processing. Each group of related shapes may then be assembled into a block. Blocks within the group may be randomly ordered according to a randomization algorithm to further complicate reconstruction of the original data file 302.

As may be appreciated, in an optional embodiment employing compression, the order of compression can affect compression efficiency. In yet another embodiment, a method according to an embodiment of the present invention could include forming a reassembled file 306 by ordering similar blocks 304 in either a heuristic method, or by randomly ordering the blocks. Evaluation of the efficiency of the block compression can be done by brute force or by heuristic, depending on the file. Randomization of block order can be done using a variety of methods. For example, in one such optional embodiment, a polymorphic randomization from a randomized stream is used.

Additional processing, such as compression and/or encryption, may be conducted on the reassembled file 306 prior to producing a final file to be stored or transmitted 310. For example, in one embodiment, the reassembled file 306 is compressed. In such an embodiment, any one of numerous methods of compression could be used. It is contemplated that the entire reassembled file 306 may, or may not, be compressed in the same manner. For example, in an optional embodiment, a compression algorithm may evaluate the reassembled file 306 and parse the reassembled file 306 for near optimal compression via different methods available to the program. In one embodiment, the algorithm is modularly developed to accept any number of compression algorithms, as well as a framework for applying the compression. In another embodiment, the user may be presented with a selection between a compression using a single method or several methods. Optionally, users may also be presented with a selection among the most efficient compression, a random compression, a block compression, or the like. It is contemplated that the compression block need not align with block boundaries from the definition of the blocks 304 in the reassembled file 306. Rather, compression may occur across block boundaries.

Referring to FIG. 7B and FIG. 1, the original data file 302 may be reconstructed from a reassembled file 306 using a block location data frame 32 corresponding to data file 17 presented in FIG. 1 above. In an illustrative embodiment including compression or encryption, the encrypted file is communicated via a transmission stream 310. The encrypted file is decrypted using a decryption key at block 309, which eventually produces a compressed file 304. The compressed file 304 may be decompressed from a compressed data file to produce a reassembled file 306. The blocks 304 of the reassembled file 306 may be reconstructed into the original data file 302 with a block location data frame 32 corresponding to data file 17.

Figure 8A:
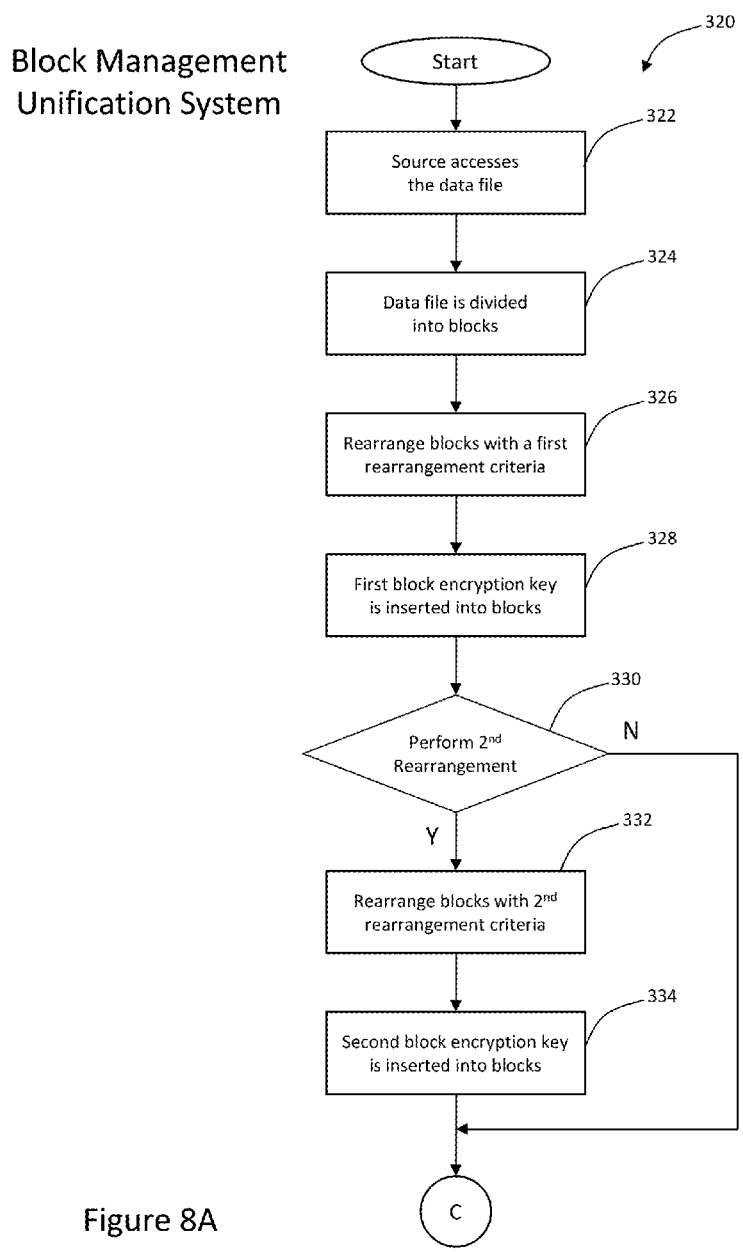
FIGS. 8A-8B shows an illustrative flowchart of the operations performed by the block management unification system module.
Figure 8B:
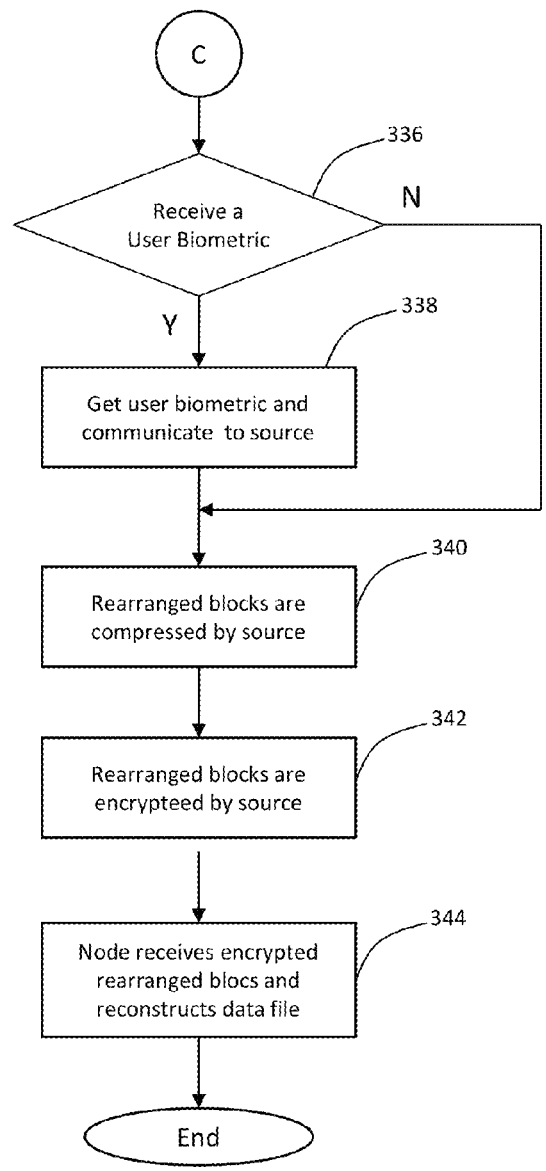

Referring now to FIGS. 8A-8B, there is shown an illustrative flowchart 320 of the operations performed by the block management unification system module 24. The illustrative method is initiated at step 322 where the source component 16 is configured to access the data file 17.

At step 324, the data file is divided into a plurality of blocks. The method then proceeds to step 326, the blocks are rearranged according to a first rearrangement criterion. By way of example and not of limitation, the first rearrangement criterion includes a randomizing module configured to divide the data file into a plurality of random blocks. At step 328, a first block encryption key is inserted into the blocks.

At decision diamond 330, a determination is made whether to perform a second rearrangement process.

If the decision is to continue with the second rearrangement process, then at step 332 the blocks are rearranged according to a second rearrangement criterion. By way of example and not of limitation, the second rearrangement criterion includes a pattern recognition module configured to generate a rearranged file that includes blocks with similar patterns.

The method proceeds to step 334 and inserts a second block encryption key into the blocks.

At decision diamond 336, a determination is made whether to receive a user biometric. If the decision is to receive the user biometric, then a user biometric is received at step 338 by the node device and communicated to the source component. At step 340, the rearranged blocks are compressed by the source component.

At step 342, the rearranged blocks are encrypted with the first block encryption key, the second block encryption key, the biometric, or any combination thereof. For the illustrative biometric embodiment, the encrypted rearranged blocks are communicated to the particular node device 12 after verifying the user biometric as a valid user.

At step 344, the node device receives the encrypted rearranged blocks, extracts the block encryption key(s), decrypts the encrypted rearranged blocks with the block encryption key(s), decompresses the rearranged blocks, and reconstructs the data file from the rearranged blocks. In one illustrative embodiment, the node decryption keys are embedded in the data file that is transmitted by the source component and is received by the particular node device.

In yet another embodiment, the system includes a partial decryption key generated by the source component and communicated to the particular node. A complete decryption key may be assembled at the particular node with a unique node identifier and the partial decryption key.

The methods presented herein may also be applied to the illustrative peer-to-peer system embodiment of FIG. 3 above, in which a node-to-node implementation is described and the particular node 12 corresponds a first node 150 and the source component 16 corresponds to the second node 152. The system and method of operation for the node-to-node implementation is similar to the source component communications with the particular node presented herein.

In the illustrative embodiment, the block management unification system (BMUS) module 24 includes a system or method where a data file is divided according to some function (b(file,k)) and then linearized, the blocks permuted, and then transmitted. With respect to BMUS, "linearization" refers to arranging the constituent block of the line in linear order, starting at the first block, and then appending the second block at the end of the first block and so on.

On the receiving end the blocks are separated by the node device, returned to their original order by the node device, and then the data file is reconstructed in its original form. The benefits of the BMUS process includes reducing redundancy in the original data, optimizing the encoding for either encryption or compression, and providing a simple encryption that can confuse an attacker.

Removing redundancy from the data has a number of advantages; the being that it removes redundancy from the message. Redundancy reduces entropy and is a form of information that can be used to ease decryption. Redundancy is also removed by most compression algorithms, facilitating faster transmission of the data file. A second method of reordering the data is to optimize encryption. Either process requires appending the order of the blocks as interleaved data so that the receiver can correctly reassemble the blocks. Before reordering, however, the decoded message would appear as if it was a secondary encryption and would serve as a transposing code on the original data. That is, a product cipher is effectively created such that:

$$E_{k,c}(M) = E_{k_j,c_j}(g_c(f_d(E_{k,t}(M))))$$

where $E_{k,t}(M)$ is the conversion of the original file into blocks, along with the permutation of those blocks, $f_d(x)$ is the duplicating of any blocks similar enough to each other to be perceived as duplicates, $g_c(x)$ is the compression algorithm applied to the image, and $E_{k_j,c_j}(x)$ is the randomized encryption. However, unlike typical product ciphers, this is a much stronger cipher since the components are guided by optimization rather than an algorithmically selected variation that follows some pre-calculable pattern.

Optimizing the reordering of blocks can implement any optimization algorithm, or it can use randomly selected algorithms. An extension of this optimization involves changing the original image or file by duplicating blocks. For example, some videos will feature images that include a large area of trees, grass, or water. Blocks decomposed from the larger area of one type of image can be very similar. The blocks may be able to be replaced by duplicate sub images that, when reconstructed, are similar enough to the original image as to be practically indistinguishable to the average viewer. That is, one block of grass appears pretty much like any other. If the different blocks comprising the larger portion of the image are duplicated/replaced with the base image and the image is reconstructed the final image can pass for the original image. In this case redundancy is created within the BMUS structure, resulting in better compression than the original image. The final encoded image is also harder to break due to the reduced redundancy after compression. Again, while this example used video, it can be extended to audio, objects, or even data files with similar characteristics.

For files that are not frame based, it is necessary to decide how many blocks will be made from the file. The block size (|B|), in the simplest case, will be:

$$|B| = \frac{|F|}{n}$$

where |F| is the size of the file to be made into blocks and n is the number of total blocks. Of course, if |F|mod n≠0 additional bytes must be added to the file. However, no more than n−1 additional bytes are needed.

In a more complicated instantiation of creating blocks, different sized blocks are chosen based on some criteria. The goal is to make blocks such that:

$$|F| = \sum_{i=1}^{n} |B_i|$$

where $|B_i|$ is the size of block i. For this implementation the block can be of any size and may be chosen by:

$i = \text{rand}(x) \| f(x, F)$

That is, the size of the block may be random, so long as it follows the constraints of the block size, |B|, presented above. Optimizing the block size can be done in a number of ways. The first way is look for objects or natural blocks in the image. The frame is analyzed geometrically to find and create blocks of a single color or closely related tones of the same color. That block is full of redundant information that can be quickly and easily compressed. By finding the largest rectangle so composed then redundancy is grouped for use. Similarly, once blocks of this type are constructed, a second pass at optimization can be done by searching for patterns that repeat in the same manner. Waves, plants, and other patterns that can be compressed using advanced algorithms, such as fractal patterns, affine transformation, and cos compressions should also be checked and maximally sized blocks based on those compressions should also be checked. Objects of different sizes may also be found in a frame.

Assume that an object has a pattern ($p_i$) that is well defined. Then, if more than one object exists in the frame, it may also be described as having some variation of the same pattern. However, that pattern may, or may not, be of the same size. In that case, the pattern must be adjusted with the magnification factor (m) of the object compared with some base pattern of the object. Therefore, all objects can be described as $o = mp_i$. But, not all objects are seen from the same angle. So, assume that there is a library of objects ($l_o$) that has a 360° view both horizontally and vertically. The pattern can be expanded to reference the library image and be expressed as $o = m(d_h)(d_v) p_i$ where the location in the reference image is designated as a 2-tuple horizontally ($d_h$) and vertically ($d_v$) in degrees. Unfortunately, defining those shapes may be difficult and not necessarily easy geometrically.

Fixing that problem may be done by again adjusting the blocks to use multiple layers. Objects are often placed in an image obscuring the background detail. An easy example is a ball on a grass lawn. In this case the ball obscures the lawn and prevents the background from being treated as a whole block. Some of the obscuring may be repaired by placing blocks of similar color or pattern together in the final permutation of blocks. However, it would be easier to treat the block as a whole without the ball in the middle of the block. Such treatment can be accomplished by removing the block with the ball and filling in the removed block with the same pattern or color around it. In this example, a similar block is copied from another portion of the bigger block and used to replace the block in which the ball was removed. The large block can then be treated as a layer and then relayered upon decryption and reassembly of the frame. The ball is then compressed on its own and replaced in the frame. In this case:

$$|F| \leq \sum_{i=1}^{n} |B_i|$$

In this implementation of optimization it is important to be able to know where blocks are to be placed. Using a Cartesian two-dimensional scheme for the pixel location of the upper left hand corner of the box, or a linear location in the frame, block placement of an object in the layer is possible.

BMUS can be used on all sorts of data files. Video and audio are similar if an analogy is drawn between video objects and audio objects (tracks and patterns). Both deal with frequencies but limit themselves to dealing with information detectable and processed by different sensors (the ear and the eye). Those techniques should be seen as analogous but frequency shifted. Data files that process character based information can also be viewed as a frequency based data repository with the individual bits viewed as representing a graph of data whose magnitude at any time i such that t=i/|F|. The magnitude of the function at time i is given by:

$$v_i = e_i - \frac{2^{|b|}}{2}$$

where $e_i$ is the encoded value of the character and |b| is the number of bits used to represent the character in the encoding. This normalizes any encoding to a cyclic and symmetrical waveform centered around the midpoint value in the encoding. Although the resultant values may be hard to calculate exactly, utilizing the Nyquist criteria, a simplified waveform that approximates the general wave shape may be employed. Because it can be described as a complex set of frequencies, the file can then be treated in the same way as both audio and video files.

This procedure uses an algorithm that varies the block size such as with a polymorphic key progression algorithm (PKPA). The BMUS polymorphic key progression algorithm may randomize the size or optimize the size in order to minimize the entropy of a block. The PKPA is used to prevent redundancy and patterns in a portion of the message, while BMUS seeks to find and group redundancy. The goals of varying the block size have the opposite effect on entropy and information content. Additionally, BMUS treats all blocks the same. Furthermore BMUS reorders the blocks. Further still, BMUS optimizes the treatment of the blocks in order to combine them. BMUS does not require randomization, but is improved with optimization. Further, BMUS does not require monitoring the network in order to be effective. Additionally, BMUS is a precursor to encryption.

BMUS is used to remove randomness and to aid compression of a file. With minor changes and combined with node pairing, it can be used to protect information on a mobile device, especially for health and sensitive information.

In one illustrative embodiment, it is possible to use a biometric as a unique identifier. This makes it possible, for example, for a health care provider to be able to request records for a patient from a mobile device. Fingerprint scanners are available on mobile devices such as iPhones and Android phones at this time, as are retinal scanners. Assume that the output from each of those devices can be used as a component in a key generation algorithm, then a unique key can be generated to associate information with both the requestor and the patient.

In the illustrative embodiment, the requester is a health care professional that is in the process of providing care to the patient. A request is generated for records out of a health care information exchange (HCIE) in which the patient's records reside. This may be a hospital or some other data warehouse. The health care provider is registered with the HCIE and has had his credentials verified and cleared for information access. That professional's biometrics will be on file for comparison and use, as will the patient's. Let $bio_d$ be the health provider's biometrics, $bio_p$ be the patient's biometrics and R be the request.

$$S \xrightarrow{f_K(bio_d, bio_p, \ldots A_h)} R$$

The system then checks the biometrics to ensure that the provider is correctly identified.

$$\text{Approval} \rightarrow \frac{<bio_d = d> \ <bio_p = p> \ <IDs>}{<\text{yes, no}>}$$

Where d is the provider's biometrics on file, p is the patient's biometrics on file, and IDs are the unique IDs of the mobile unit. When the biometric is confirmed, the requested record is then encrypted using the requesting machines unique identifiers as well as the biometrics of the doctor and the patient. An encrypted copy of the record, or file, is then sent to the provider.

$$S \xleftarrow{f_K(bio_d, bio_p, \ldots A_h)} N$$

At the receiving side, a request is then made for the biometrics of the patient in order to confirm that the patient agrees with the data access. When the finger print and/or the retinal scan is input, the decryption takes place. A legible copy of the record is recovered only when the correct biometrics are input in a timely manner with the request.

$$x = \begin{cases} M, & t_0 \le t \le t_{max} \\ 0, & \text{if } t > t_{max} \end{cases}$$

Using any other biometrics results in an unreadable image and no useful information recovery. Further, the file also checks the time when a file is opened. Files can be coded so that time comprises a further component of the key. Any time outside of the allowable range to access the file acts as an incorrect key. In this way, the BMUS matrix allows time restricted and biometrically controlled access to data. Mobile devices are allowed and useful for both reading and entering data by the provider.

Communications may flow in either direction and allow the provider to use any kind of app from the device to enter data. The device may store biometric data read locally and encrypt data back to the HCIE for storage with the patient's records, as well as with the provider's files. Files may be sorted and stored by biometric identifiers as well. While this practice has been described for a HIPPA application, it may be used for any type of file and mobile devices. This brings two-factor authentication directly to mobile devices.

Other Applications

Although the illustrative system, methods, and devices described herein rely on a network to access the data file, the data file may also reside on a portable memory module such as a CD or DVD, and the above system and methods may also be applied to a CD or DVD. More specifically, the node pairing process described above can be used to generate an encrypted data file that is stored on the illustrative CD/DVD. To decrypt the encrypted data file on the CD or DVD, a CD or DVD player access the CD or DVD serial number to generate the decryption key.

A CD or DVD has a serial number placed thereon by the manufacture, and this serial numbers includes information such a lot number, manufacturer information, data and number of discs made. The CD or DVD serial number provides the unique identifier that is needed to generate the decryption keys, much like the unique node identifier described in the node pairing module 20 above.

A modified CODEC resides on the CD or DVD player that controls the decryption process by reading the serial number on the CD or DVD to generate the decryption key that is used to decrypt the encrypted content on the CD or DVD. Without the right serial number on the CD or DVD, the CODEC cannot read the encrypted content, rendering a pirated or illegal copy of the CD or DVD useless.

The systems, methods, and devices may be adopted by utility companies to support secure communications and to ensure reliability. By way of example and not of limitation, the utilities include electrical utilities, power facilities such as gas powered power plants or coal fired power plants, water utilities, wastewater utilities and other such regulated entities that achieve economies of scale. The system, methods, and devices described herein may also be used for facilities management and to prevent hackers from accessing facilities management systems.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure.

Persons of ordinary skill in the art will realize that the following description is illustrative and not in any way limiting. Other embodiments of the claimed subject matter will readily suggest themselves to such skilled persons having the benefit of this disclosure. While certain embodiments of the present invention have been shown and described it is to be understood that the present invention is subject to many modifications and changes without departing from the spirit and scope of the claims presented herein. The scope of the invention is determined by the following claims and their legal equivalents.

What is claimed is:

1. A block management unification system for embedding a watermark into a data file and communicating the data file to a particular node from a source component, the system comprising:
   a particular node operatively coupled to a network;
   a source component operatively coupled to the network, wherein the source component communicates with the particular node;
   a node identifier request communicated from the source component to the particular node;
   a query performed at the particular node for at least one node identifier that is unique to the particular node, the unique node identifier communicated from the particular node to the source component;
   a watermark embedded into the data file by the source component;
   a permutation key that permutes the watermark, wherein the permutation key is changed so the location of the watermark changes;
   a first rearrangement criterion corresponding to the source component that includes a randomizing module that divides the data file into a plurality of random blocks;
   a first block encryption key inserted into the blocks by the source component;
   a second rearrangement criterion corresponding to the source component that includes a pattern recognition module that generates a rearranged file having blocks with similar patterns;
   a second block encryption key inserted into the blocks by the source component;
   a compression module corresponding to the source component that compresses the rearranged blocks;
   an encryption module corresponding to the source component that encrypts the rearranged blocks corresponding to the data file with the first block encryption key and the second block encryption key;
   an encrypted data file generated by the source component, wherein the encrypted data file is produced with an encryption algorithm that utilizes the unique node identifier to generate an encryption key;
   a partial node decryption key that is generated by the source component and communicated from the source component to the particular node;
   a partial block management decryption key generated by the source component that is communicated to the particular node having a unique node identifier;
   a complete node decryption key assembled at the particular node with the unique node identifier and the partial decryption key;
   a block management decryption key assembled at the particular node with the unique node identifier and the partial block management decryption key;
   the encrypted data file communicated from the source component to the particular node and decrypting the encrypted data file at the particular node with the complete node decryption key that corresponds to the particular node, and enabling the particular node to recover the watermark from the data file with the permutation key; and
   the block management decryption key decrypting the encrypted rearranged block with the first block encryption key and the second block encryption key.

2. The system of claim 1 wherein the watermark is used to detect the source component for the data file, and when the watermark does not correspond to the particular node device, the source component interrupts transmission of the data file based on verifying the identity of the particular node sending the encrypted data file.

3. The system of claim 1 wherein the encrypted data file for the particular node includes a plurality of inserted bits that are inserted into a plurality of data frames that correspond to the data file.

4. The system of claim 1 wherein the encrypted data file for the particular node includes removing a plurality of bits from a plurality of data frames that correspond to the data file.

5. The system of claim 1 wherein the watermark includes an invisible watermark embedded in at least one data frame corresponding to the data file.

6. The system of claim 1 wherein the data file is split into an audio stream and a video stream.

7. The system of claim 6 wherein the audio stream includes an invalid watermark that does not correspond to the particular node device, and the particular node device modifies the audio stream because of the invalid watermark.

8. A block management unification system for embedding a watermark into a data file and communicating the data file to a first node from a second node, the system comprising:
   a first node;
   a second node communicatively coupled the first node;
   a node identifier request communicated from the second node to the first node;
   a query performed at the first node for at least one node identifier that is unique to the first node, the unique node identifier communicated from the first node to the second node;
   a watermark embedded into the data file by the second node;
   a permutation key that permutes the watermark, wherein the permutation key is changed so the location of the watermark changes;
   a first rearrangement criterion corresponding to the source component that includes a randomizing module that divides the data file into a plurality of random blocks;
   a first block encryption key inserted into the blocks by the source component;
   a second rearrangement criterion corresponding to the source component that includes a pattern recognition module that generates a rearranged file having blocks with similar patterns;
   a second block encryption key inserted into the blocks by the source component;
   a compression module corresponding to the source component that compresses the rearranged blocks;
   an encryption module corresponding to the source component that encrypts the rearranged blocks corresponding to the data file with the first block encryption key and the second block encryption key;
   an encrypted data file generated by the second node, wherein the encrypted data file is produced with an encryption algorithm that utilizes the unique node identifier to generate an encryption key;
   a partial node decryption key that is generated by the source component and communicated from the source component to the particular node;
   a partial block management decryption key generated by the source component that is communicated to the particular node having a unique node identifier;
   a complete node decryption key assembled at the particular node with the unique node identifier and the partial decryption key;

a block management decryption key assembled at the particular node with the unique node identifier and the partial block management decryption key;

the encrypted data file communicated from the second node to the first node, and decrypting the encrypted data file at the first node with the complete node decryption key that corresponds to the first node, and enabling the first node to recover the watermark from the data file with the permutation key; and the block management decryption key decrypting the encrypted rearranged block with the first block encryption key and the second block encryption key.

9. The system of claim 8 wherein the watermark is used to detect that the second node transmitted the data file, and when the watermark does not correspond to the first node, the second node interrupts transmission of the data file based on verifying the identity of particular node sending the encrypted data file.

10. The system of claim 8 wherein the encrypted data file for the first node includes a plurality of inserted bits that are inserted into a plurality of data frames that correspond to the data file.

11. The system of claim 8 wherein the encrypted data file for the first node includes removing a plurality of bits from a plurality of data frames that correspond to the data file.

12. The system of claim 8 wherein the watermark includes an invisible watermark embedded in at least one data frame corresponding to the data file.

13. The system of claim 8 wherein the data file is split into an audio stream and a video stream.

14. The system of claim 13 wherein the audio stream includes an invalid watermark that does not correspond to the first node, and the first node modifies the audio stream because of the invalid watermark.

15. A method for embedding a watermark into a data file and communicating the data file to a particular node from a source component, the method comprising: communicating a node identifier request from the source component to the particular node;

performing a query at the particular node for at least one node identifier that is unique to the particular node;

communicating the unique node identifier from the particular node to the source component;

enabling the source component to access a data file;

enabling the source component to embed a watermark into the data file;

permuting the watermark with a permutation key;

changing the permutation key in the data file so the location of the watermark changes;

dividing the data file into a plurality of blocks;

rearranging the blocks according to a first rearrangement criterion corresponding to the source component that includes a randomizing module that divides the data file into a plurality of random blocks;

inserting a first block encryption key into the blocks at the source component;

rearranging the blocks according to a second rearrangement criterion corresponding to the source component that includes a pattern recognition module that generates a rearranged file having blocks with similar patterns;

inserting a second block encryption key into the blocks at the source component;

compressing the rearranged blocks at the source component;

encrypting the rearranged blocks with the first block encryption key and the second block encryption key at the source component;

generating an encrypted data file for the particular node at the source component, wherein the encrypted data file is produced with an encryption algorithm that utilizes the unique node identifier to generate an encryption key;

generating a partial node decryption key at the source component and communicating the partial node decryption key to the particular node;

generating a partial block management decryption key at the source component that is communicated to the particular node having the unique identifier;

generating a complete node decryption key at the particular node with the unique node identifier and the partial decryption key;

assembling a block management decryption key at the particular node with the unique node identifier and the partial block management decryption key;

communicating the encrypted data file from the source component to the particular node;

decrypting the encrypted data file at the particular node with the complete node decryption key that corresponds to the particular node; and enabling the particular node to recover the watermark from the data file with the permutation key; and enabling the block management decryption key to decrypt the encrypted rearranged block with the first block encryption key and the second block encryption key.

16. The method of claim 15 further comprising using the detection of the watermark in the data file to identify the source component, and when the watermark does not correspond to the particular node device, the source component interrupts transmission of the data file based on verifying the identity of the particular node sending the encrypted data file.

17. The method of claim 15 wherein generating the encrypted data file for the particular node at the source component includes inserting bits into a plurality of data frames corresponding to the data file.

18. The method of claim 15 wherein generating the encrypted data file for the particular node at the source component includes removing bits from a plurality of data frames corresponding to the data file.

19. The method of claim 15 wherein the watermark includes an invisible watermark embedded in at least one data frame corresponding to the data file.

20. The method of claim 15 wherein the data file is split into an audio stream and a video stream.

21. The method of claim 20 further comprising:

identifying an invalid watermark in the audio stream that does not correspond to the particular node device; and enabling the particular node device to modify the audio stream because of the invalid watermark.

* * * * *